US012634675B2

(12) United States Patent
Wang et al.

(10) Patent No.: US 12,634,675 B2
(45) Date of Patent: May 19, 2026

(54) METHODS AND APPARATUSES FOR MOBILITY BETWEEN DIFFERENT COMMUNICATION SYSTEMS

(71) Applicant: Telefonaktiebolaget LM Ericsson (publ), Stockholm (SE)

(72) Inventors: Chunbo Wang, Beijing (CN); Juying Gan, Shanghai (CN); Yunjie Lu, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 422 days.

(21) Appl. No.: 18/020,298

(22) PCT Filed: Jul. 7, 2021

(86) PCT No.: PCT/CN2021/105056
§ 371 (c)(1),
(2) Date: Feb. 8, 2023

(87) PCT Pub. No.: WO2022/033248
PCT Pub. Date: Feb. 17, 2022

(65) Prior Publication Data
US 2023/0276220 A1    Aug. 31, 2023

(30) Foreign Application Priority Data

Aug. 10, 2020    (WO) ................ PCT/CN2020/108264

(51) Int. Cl.
*H04W 8/10*         (2009.01)
*H04W 60/00*        (2009.01)
*H04W 36/14*        (2009.01)
(52) U.S. Cl.
CPC ............. *H04W 8/10* (2013.01); *H04W 60/00* (2013.01); *H04W 36/1443* (2023.05)

(58) Field of Classification Search
CPC ... H04W 8/10; H04W 60/00; H04W 36/1443; H04W 48/18; H04W 48/16; H04W 8/00;
(Continued)

(56) References Cited

U.S. PATENT DOCUMENTS

2018/0376384 A1    12/2018  Youn et al.
2019/0124561 A1*   4/2019   Faccin ................. H04W 48/18
(Continued)

FOREIGN PATENT DOCUMENTS

CN    109155909 A    1/2019
CN    109673031 A    4/2019
(Continued)

OTHER PUBLICATIONS

3GPP, "3rd Generation Partnership Project; Technical Specification Group Services and System Aspects; Procedures for the 5G System (5GS); Stage 2 (Release 16)", 3GPP TS 23.502 V16.2.0, Sep. 2019, 525 pages.

(Continued)

*Primary Examiner* — Nimesh Patel
(74) *Attorney, Agent, or Firm* — Murphy, Bilak & Homiller, PLLC

(57) ABSTRACT

Methods and apparatuses for mobility between different communication systems are disclosed. According to an embodiment, a session management function (SMF) sends, to a service provider, a request for registering information related to the SMF to the service provider. The information related to the SMF comprises information indicating or derived from an Internet protocol (IP) address of a packet data network (PDN) gateway (PGW) control plane (PGW-C) that is combined together with the SMF. The SMF receives, from the service provider, a response to the request.

20 Claims, 15 Drawing Sheets

(58) Field of Classification Search

CPC ....... H04W 4/50; H04W 24/02; H04W 88/18; H04W 88/182; H04W 8/005; H04W 8/02; H04W 8/08; H04W 8/065; H04W 8/12; H04W 28/0925; H04W 92/02; H04W 88/16; H04W 28/0835; H04W 28/0846; H04W 28/0992; H04W 28/16; H04W 72/04; H04W 64/003; H04W 48/20; H04L 67/51; H04L 67/30; H04L 67/56; H04L 41/40; H04L 41/5058; H04L 61/4511; H04L 65/1016; H04L 41/0895; H04L 65/1073; H04L 67/55; H04L 12/1407; H04L 41/0894; H04L 67/303; H04L 67/563; H04L 63/0281; H04L 63/102; H04L 65/1045; H04L 41/14; H04L 41/16; H04L 65/1069; H04L 41/0803; H04L 41/142; H04L 63/0263; H04L 61/5007; H04L 65/1104; H04L 41/085; H04L 41/0823; H04L 41/50; H04L 47/125; H04L 65/80; H04L 67/101; H04L 67/5682; H04L 9/40; H04L 65/1083; H04L 2209/80; H04L 27/00; H04L 41/5067; H04L 45/302; H04L 43/062; H04L 45/308; H04L 47/20; H04M 15/66; H04M 15/8228; H04M 15/8214; H04M 15/8016; H04M 15/8033; G06N 20/00; G06N 3/08; G06N 3/082; G06N 20/20; G06N 3/045; G06N 3/048; G06N 5/02; G06F 2221/2117; G06F 21/44; G06F 9/542

See application file for complete search history.

(56) References Cited

U.S. PATENT DOCUMENTS

| | | | | |
|---|---|---|---|---|
| 2019/0174449 | A1* | 6/2019 | Shan | H04W 60/04 |
| 2019/0230556 | A1* | 7/2019 | Lee | H04W 28/16 |
| 2019/0261453 | A1* | 8/2019 | Jain | H04W 8/183 |
| 2020/0260340 | A1* | 8/2020 | Jing | H04W 76/10 |
| 2020/0344648 | A1* | 10/2020 | Kawasaki | H04W 36/14 |
| 2021/0219140 | A1* | 7/2021 | Salkintzis | H04W 12/08 |
| 2021/0400576 | A1* | 12/2021 | Lee | H04M 15/61 |

FOREIGN PATENT DOCUMENTS

| | | | |
|---|---|---|---|
| CN | 111226472 | A | 6/2020 |
| EP | 3657868 | A1 | 5/2020 |
| WO | 2018230928 | A1 | 12/2018 |
| WO | 2020098706 | A1 | 5/2020 |

OTHER PUBLICATIONS

3GPP, "3rd Generation Partnership Project; Technical Specification Group Services and System Aspects; System Architecture for the 5G System (5GS); Stage 2 (Release 16)", 3GPP TS 23.501 V16.2.0, Sep. 2019, 391 pages.

3GPP, "3GPP TS 23.401 V16.7.0", 3rd Generation Partnership Project; Technical Specification Group Services and System Aspects; General Packet Radio Service (GPRS) enhancements for Evolved Universal Terrestrial Radio Access Network (E-UTRAN) access (Release 16), Jul. 2020, 1-440.

3GPP, "3GPP TS 23.502 V16.4.0", 3rd Generation Partnership Project; Technical Specification Group Services and System Aspects; Procedures for the 5G System (5GS); Stage 2 (Release 16), Mar. 2020, 1-582.

3GPP, "3GPP TS 23.502 V16.5.0", 3rd Generation Partnership Project; Technical Specification Group Services and System Aspects; Procedures for the 5G System (5GS); Stage 2 (Release 16), Jul. 2020, 1-594.

3GPP, "3GPP TS 23.632 V16.2.0", 3rd Generation Partnership Project; Technical Specification Group Core Network and Terminals; User data interworking, coexistence and migration; Stage 2; (Release 16), Jun. 2020, 1-50.

3GPP, "3GPP TS 29.273 V16.1.0", 3rd Generation Partnership Project; Technical Specification Group Core Network and Terminals; Evolved Packet System (EPS); 3GPP EPS AAA interfaces (Release 16), Jun. 2020, 1-200.

3GPP, "3GPP TS 29.503 V17.3.0", 3rd Generation Partnership Project; Technical Specification Group Core Network and Terminals; 5G System; Unified Data Management Services; Stage 3 (Release 17), Jun. 2021, 1-403.

3GPP, "3GPP TS 29.510 V17.2.0", 3rd Generation Partnership Project; Technical Specification Group Core Network and Terminals; 5G System; Network Function Repository Services; Stage 3 (Release 17), Jun. 2021, 1-256.

3GPP, "3rd Generation Partnership Project; Technical Specification Group Services and System Aspects; Architecture enhancements for non-3GPP accesses (Release 16)", 3GPP TS 23.402 V16.0.0, Jun. 2019, 1-314.

3GPP, "3rd Generation Partnership Project; Technical Specification Group Services and System Aspects; System architecture for the 5G System (5GS); Stage 2 (Release 16)", 3GPP TS 23.501 V16.4.0, Mar. 2020, 1-430.

Ericsson, et al., "Discovering SMF instance at EPS to 5GS interworking", 3GPP TSG-SA WG2 Meeting #128bis, 82-187830, was S2-187377, Sofia Antipolis, France, Aug. 20-24, 2018, 1-17.

Huawei, et al., "EPS bearer synchronization when move from EPC to 5GC(Network deletes bearer locally)", 3GPP TSG-SA WG2 Meeting #131, S2-1901862, Santa Cruz—Tenerife, Spain, Feb. 25-Mar. 1, 2019, 1-11.

Huawei, et al., "EPS bearer synchronization when move from EPC to 5GC(UE deletes the bearer locally)", 3GPP TSG-SA WG2 Meeting #131, S2-1902648, Santa Cruz—Tenerife, Spain, Feb. 25-Mar. 1, 2019, 1-6.

Ericsson, et al., "Discovering SMF instance at EPS to 5GS interworking", 3GPP TSG-SA WG2 Meeting #128bis, S2-188532, was S2-187830, Sofia Antipolis, France, Aug. 20-24, 2018, 1-17.

3GPP, "3rd Generation Partnership Project; Technical Specification Group Services and System Aspects; Procedures for the 5G System (5GS); Stage 2 (Release 16)", 3GPP TS 23.502 V16.5.1, Aug. 2020, 1-594.

Ericsson , "PGW IP Address", 3GPP TSG-CT Meeting #93-e, CP-212159 (revision of C4-214415), E-meeting, Sep. 13-15, 2021, 1-5.

* cited by examiner

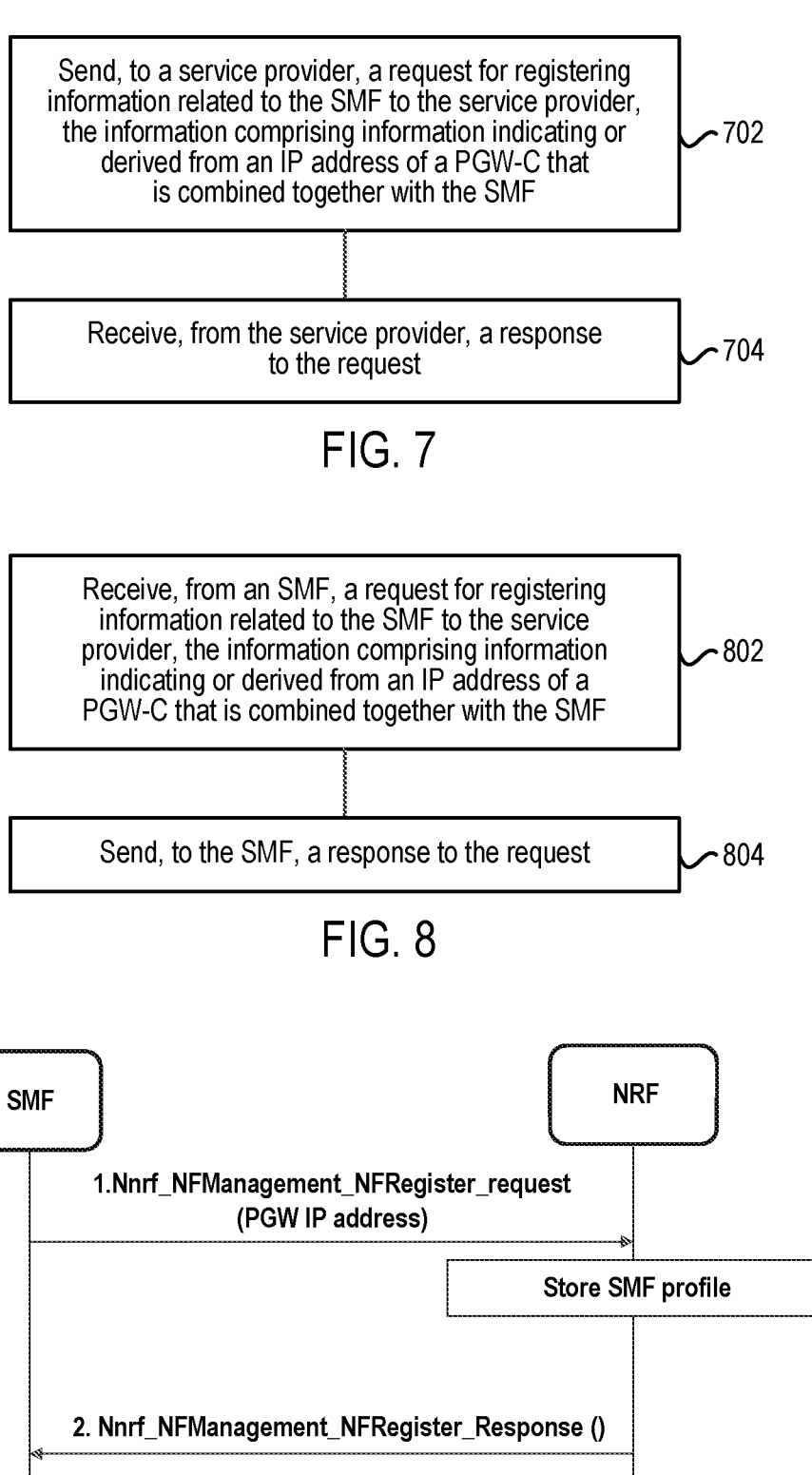

Send, to a service provider, a request for registering information related to the SMF to the service provider, the information comprising information indicating or derived from an IP address of a PGW-C that is combined together with the SMF   ~702

Receive, from the service provider, a response to the request   ~704

FIG. 7

Receive, from an SMF, a request for registering information related to the SMF to the service provider, the information comprising information indicating or derived from an IP address of a PGW-C that is combined together with the SMF   ~802

Send, to the SMF, a response to the request   ~804

FIG. 8

SMF

NRF

1.Nnrf_NFManagement_NFRegister_request
(PGW IP address)

Store SMF profile

2. Nnrf_NFManagement_NFRegister_Response ()

FIG. 9

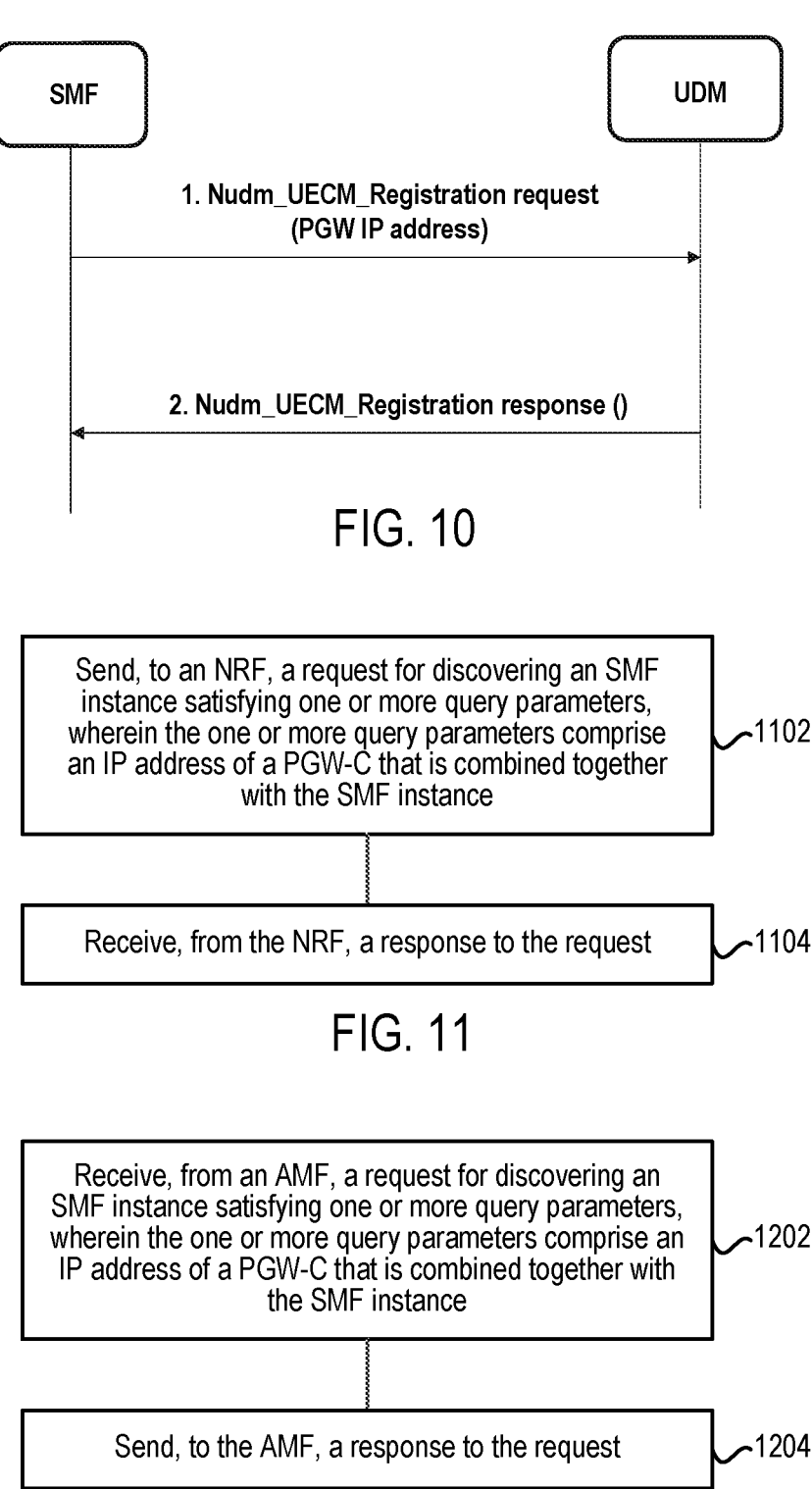

FIG. 10

Send, to an NRF, a request for discovering an SMF instance satisfying one or more query parameters, wherein the one or more query parameters comprise an IP address of a PGW-C that is combined together with the SMF instance    1102

Receive, from the NRF, a response to the request    1104

FIG. 11

Receive, from an AMF, a request for discovering an SMF instance satisfying one or more query parameters, wherein the one or more query parameters comprise an IP address of a PGW-C that is combined together with the SMF instance    1202

Send, to the AMF, a response to the request    1204

FIG. 12

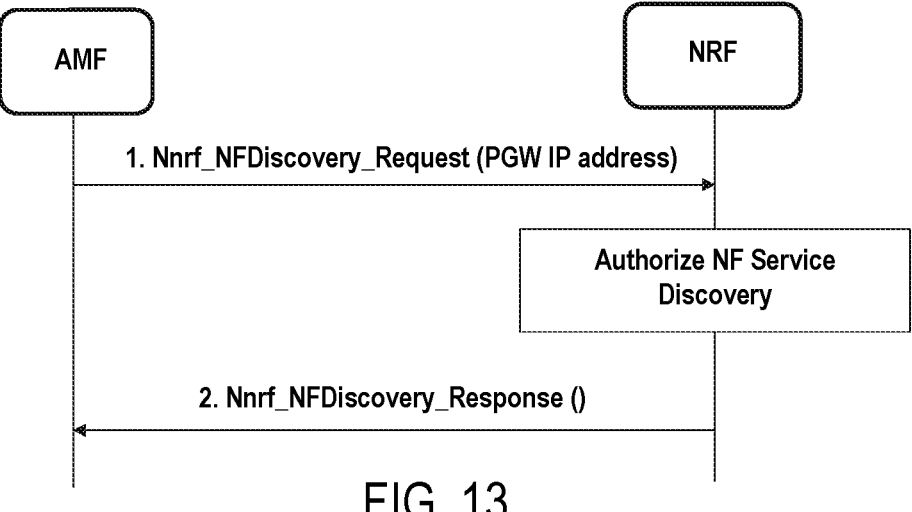

FIG. 13

Obtain, from a service provider, current or updated
subscription information of a terminal device, the
current or updated subscription information
comprising information indicating or derived
from an IP address of a PGW-C that
is combined together with an SMF

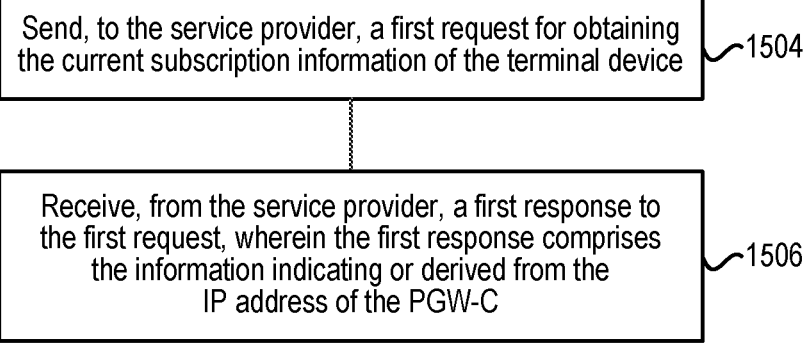

Send, to the service provider, a first request for obtaining
the current subscription information of the terminal device

1504

Receive, from the service provider, a first response to
the first request, wherein the first response comprises
the information indicating or derived from the
IP address of the PGW-C

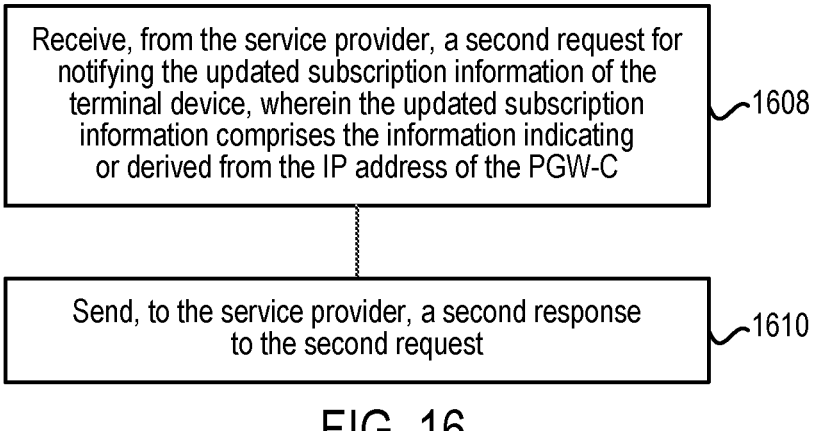

Receive, from the service provider, a second request for notifying the updated subscription information of the terminal device, wherein the updated subscription information comprises the information indicating or derived from the IP address of the PGW-C　　1608

Send, to the service provider, a second response to the second request　　1610

FIG. 16

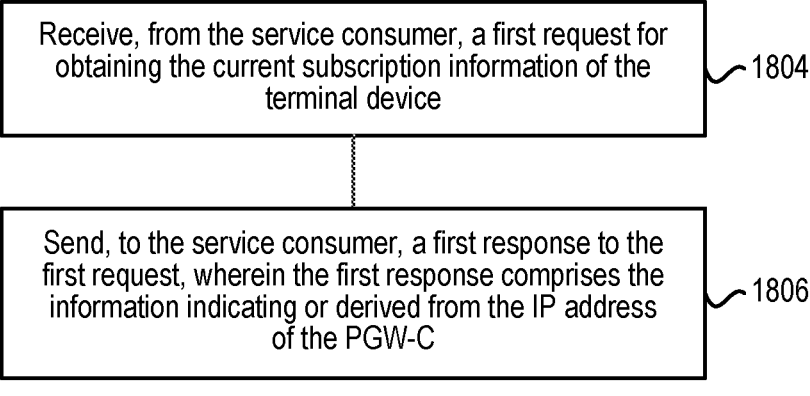

Provide, to a service consumer, current or updated subscription information of a terminal device, the current or updated subscription information comprising information indicating or derived from an IP address of a PGW-C that is combined together with an SMF　　1702

FIG. 17

Receive, from the service consumer, a first request for obtaining the current subscription information of the terminal device　　1804

Send, to the service consumer, a first response to the first request, wherein the first response comprises the information indicating or derived from the IP address of the PGW-C　　1806

FIG. 18

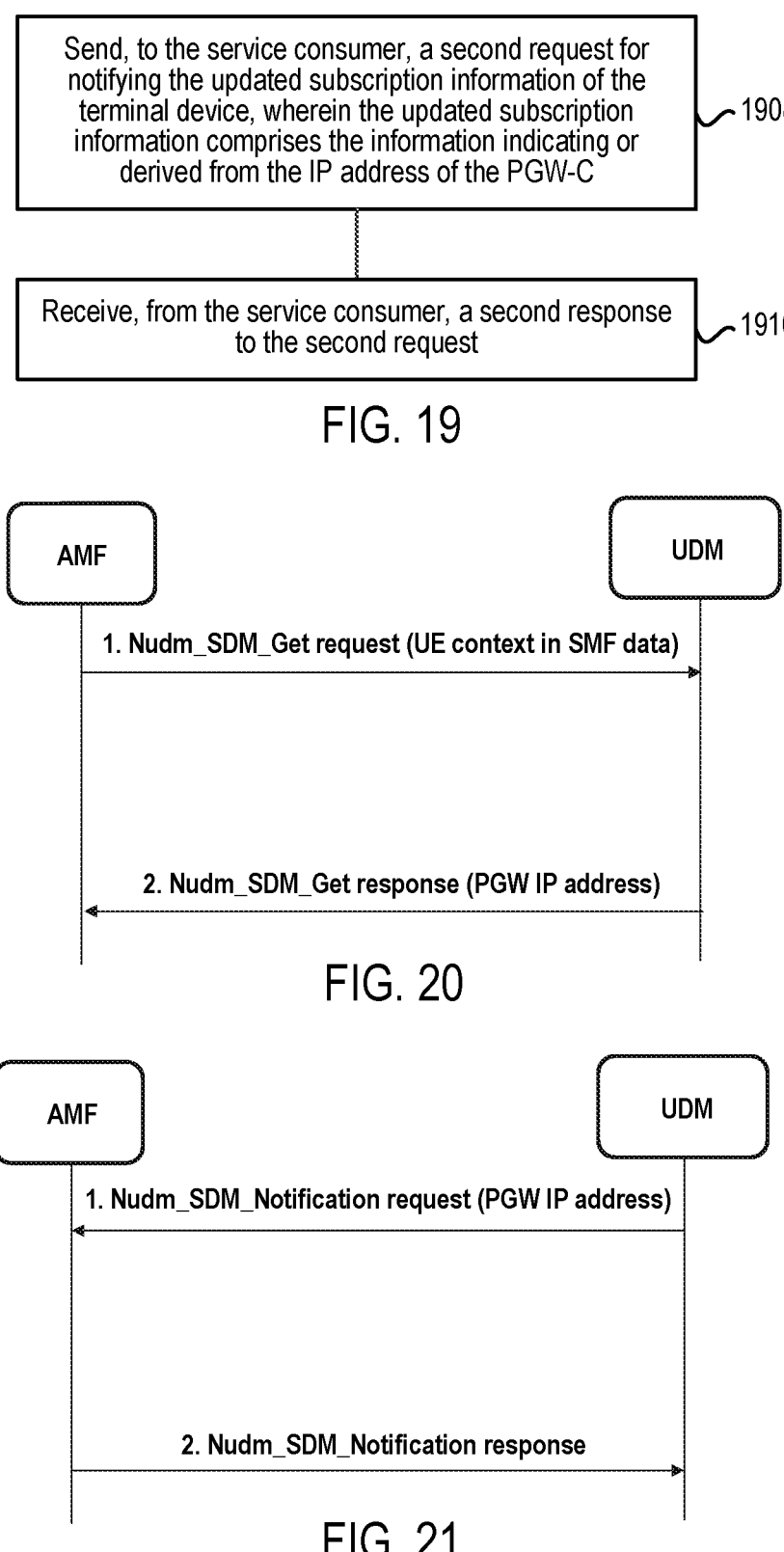

Send, to the service consumer, a second request for notifying the updated subscription information of the terminal device, wherein the updated subscription information comprises the information indicating or derived from the IP address of the PGW-C ⟋1908

Receive, from the service consumer, a second response to the second request ⟋1910

FIG. 19

AMF     UDM

1. Nudm_SDM_Get request (UE context in SMF data)

2. Nudm_SDM_Get response (PGW IP address)

FIG. 20

AMF     UDM

1. Nudm_SDM_Notification request (PGW IP address)

2. Nudm_SDM_Notification response

FIG. 21

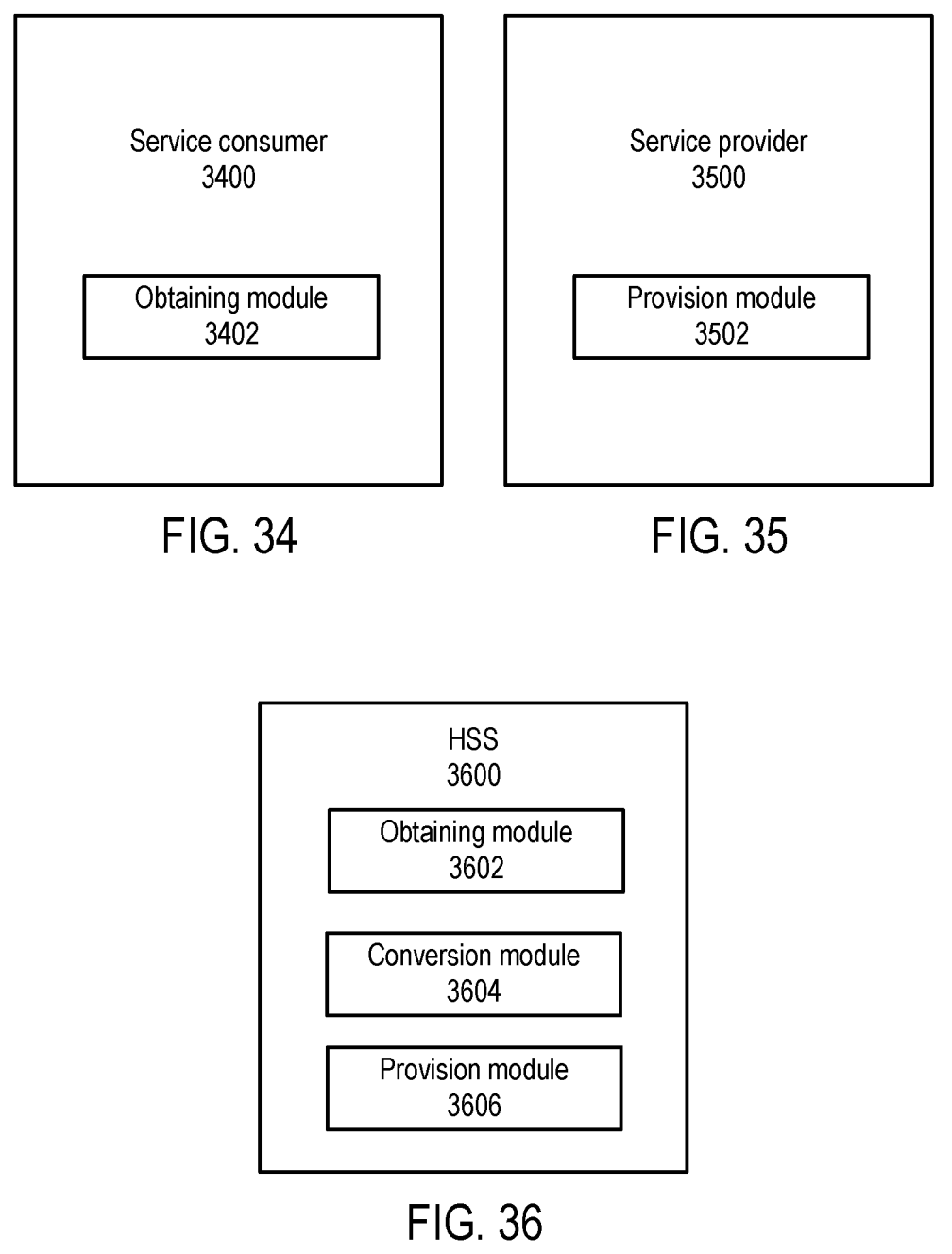

```
┌─────────────────────────────┐
│                             │
│      Service consumer       │
│          3400               │
│                             │
│    ┌─────────────────────┐  │
│    │   Obtaining module  │  │
│    │        3402         │  │
│    └─────────────────────┘  │
│                             │
└─────────────────────────────┘
```

FIG. 34

```
┌─────────────────────────────┐
│                             │
│      Service provider       │
│          3500               │
│                             │
│    ┌─────────────────────┐  │
│    │   Provision module  │  │
│    │        3502         │  │
│    └─────────────────────┘  │
│                             │
└─────────────────────────────┘
```

FIG. 35

```
┌─────────────────────────────┐
│            HSS              │
│           3600              │
│    ┌─────────────────────┐  │
│    │   Obtaining module  │  │
│    │        3602         │  │
│    └─────────────────────┘  │
│                             │
│    ┌─────────────────────┐  │
│    │  Conversion module  │  │
│    │        3604         │  │
│    └─────────────────────┘  │
│                             │
│    ┌─────────────────────┐  │
│    │   Provision module  │  │
│    │        3606         │  │
│    └─────────────────────┘  │
└─────────────────────────────┘
```

FIG. 36

METHODS AND APPARATUSES FOR MOBILITY BETWEEN DIFFERENT COMMUNICATION SYSTEMS

TECHNICAL FIELD

Embodiments of the disclosure generally relate to communication, and, more particularly, to methods and apparatuses for mobility between different communication systems.

BACKGROUND

This section introduces aspects that may facilitate better understanding of the present disclosure. Accordingly, the statements of this section are to be read in this light and are not to be understood as admissions about what is in the prior art or what is not in the prior art.

The 3rd generation partnership project (3GPP) Release 15 technical specification (TS) 23.501 V16.4.0 and TS 23.502 V16.4.0 define the interworking between evolved packet core (EPC) and 5th generation core (5GC) network. Typically, the non-roaming EPC/E-UTRAN and 5th generation system (5GS) interworking network architecture is shown in FIG. 1 (FIG. 4.3.1-1 of TS 23.501) and the non-roaming EPC/ePDG and 5GS interworking network architecture is shown in FIG. 2 (FIG. 4.3.4.1-1 of TS 23.501). The term E-UTRAN refers to evolved UMTS terrestrial radio access network, the UMTS refers to universal mobile telecommunications system and the ePDG refers to evolved packet data gateway.

To support the interworking between EPC and 5GC, the combined packet data network (PDN) gateway (PGW) control plane (PGW-C)+session management function (SMF) shall be selected for PDN/protocol data unit (PDU) session establishment, and the PGW identity of the combined PGW-C+SMF for the PDU/PDN session is shared and synchronized between EPC and 5GC: via home subscriber server (HSS) and unified data management (UDM) for the interworking between ePDG/EPC and 5GS, and for the interworking between EPC/E-UTRAN and 5GS without N26; or via mobility management entity (MME) and access and mobility management function (AMF) for the interworking between EPC/E-UTRAN and 5GS with N26.

According to TS 23.502 clause 4.11.4.3.6 as excerpted below, the interworking with ePDG is only supported with general packet radio service (GPRS) tunneling protocol (GTP) based S2b. The S6b interface is optional.
4.11.4.3.6 Use of N10 interface instead of S6b This clause applies to scenarios when ePDG is connected to SMF+PGW-C and S6b in not used. It is applicable for procedures specified in TS 23.402 including mobility between EPC/ePDG and EPC/EUTRAN and also for mobility between EPC/ePDG and 5GS.

FIG. 3 illustrates the non-roaming architecture for interworking between ePDG/EPC and EPC/E-UTRAN. As shown, the ePDG/EPC and EPC/E-UTRAN interworking shall also be based on the combined PGW-C+SMF to support the session continuity after EPC and 5GC integration, because the UE can do the mobility among 5GS, EPC/E-UTRAN and ePDG/EPC in any order.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved solution for mobility between different communication systems. In particular, one of the problems to be solved by the disclosure is that the mobility between EPC and 5GC and/or the mobility between ePDG and LTE may fail in the existing solution.

According to a first aspect of the disclosure, there is provided a method performed by a session management function (SMF). The method may comprise sending, to a service provider, a request for registering information related to the SMF to the service provider. The information related to the SMF may comprise information indicating or derived from an Internet protocol (IP) address of a packet data network (PDN) gateway (PGW) control plane (PGW-C) that is combined together with the SMF. The method may further comprise receiving, from the service provider, a response to the request.

In this way, it is possible to support the EPC and 5GC interworking and/or the ePDG and LTE interworking. In the case where the information indicating the IP address of the PGW-C is included, the existing EPC network interfaces need not to be impacted. In the case where the information derived from the IP address of the PGW-C is included, the SBI interfaces in 5GC network need not to be impacted.

In an embodiment of the disclosure, the information derived from the IP address of the PGW-C may be an octet string filled in an information element called "PGW fully qualified domain name (FQDN)".

In an embodiment of the disclosure, the service provider may be a network function (NF) repository function (NRF).

In an embodiment of the disclosure, the information related to the SMF may be a profile of the SMF.

In an embodiment of the disclosure, the request may be an Nnrf_NFManagement_NFRegister_request.

In an embodiment of the disclosure, the service provider may be a unified data management (UDM).

In an embodiment of the disclosure, the SMF may be registered as a NF serving a protocol data unit (PDU) session for a terminal device.

In an embodiment of the disclosure, the request may be an Nudm_UECM_Registration request.

In an embodiment of the disclosure, the request may be sent in response to a PDU session being established for a terminal device.

According to a second aspect of the disclosure, there is provided a method performed by a service provider. The method may comprise receiving, from an SMF, a request for registering information related to the SMF to the service provider. The information related to the SMF may comprise information indicating or derived from an IP address of a PGW-C that is combined together with the SMF. The method may further comprise sending, to the SMF, a response to the request.

In this way, it is possible to support the EPC and 5GC interworking and/or the ePDG and LTE interworking. In the case where the information indicating the IP address of the PGW-C is included, the existing EPC network interfaces need not to be impacted. In the case where the information derived from the IP address of the PGW-C is included, the SBI interfaces in 5GC network need not to be impacted.

In an embodiment of the disclosure, the information derived from the IP address of the PGW-C may be an octet string filled in an information element called "PGW FQDN".

In an embodiment of the disclosure, the service provider may be an NRF.

In an embodiment of the disclosure, the information related to the SMF may be a profile of the SMF.

In an embodiment of the disclosure, the request may be an Nnrf_NFManagement_NFRegister_request.

In an embodiment of the disclosure, the service provider may be a UDM.

In an embodiment of the disclosure, the SMF may be registered as a NF serving a PDU session for a terminal device.

In an embodiment of the disclosure, the request may be an Nudm_UECM_Registration request.

In an embodiment of the disclosure, the request may be received in response to a PDU session being established for a terminal device.

According to a third aspect of the disclosure, there is provided a method performed by an access and mobility management function (AMF). The method may comprise sending, to an NRF, a request for discovering an SMF instance satisfying one or more query parameters. The one or more query parameters may comprise an IP address of a PGW-C that is combined together with the SMF instance. The method may further comprise receiving, from the NRF, a response to the request.

In this way, it is possible to support the EPC and 5GC interworking without impacting the existing EPC network.

In an embodiment of the disclosure, the response may comprise information related to the SMF instance.

In an embodiment of the disclosure, the request may be an Nnrf_NFDiscovery_Request.

In an embodiment of the disclosure, the request may be sent in response to a handover of a terminal device from evolved packet core (EPC) to 5th generation core (5GC).

In an embodiment of the disclosure, the IP address of the PGW-C may be obtained from a mobility management entity (MME) or a combined entity of a home subscriber server (HSS) and a UDM.

According to a fourth aspect of the disclosure, there is provided a method performed by an NRF. The method may comprise receiving, from an AMF, a request for discovering an SMF instance satisfying one or more query parameters. The one or more query parameters may comprise an IP address of a PGW-C that is combined together with the SMF instance. The method may further comprise sending, to the AMF, a response to the request.

In this way, it is possible to support the EPC and 5GC interworking without impacting the existing EPC network.

In an embodiment of the disclosure, the response may comprise information related to the SMF instance.

In an embodiment of the disclosure, the request may be an Nnrf_NFDiscovery_Request.

In an embodiment of the disclosure, the request may be received in response to a handover of a terminal device from EPC to 5GC.

According to a fifth aspect of the disclosure, there is provided a method performed by a service consumer. The method may comprise obtaining, from a service provider, current or updated subscription information of a terminal device. The current or updated subscription information of the terminal device may comprise information indicating or derived from an IP address of a PGW-C that is combined together with an SMF.

In this way, it is possible to support the EPC and 5GC interworking and/or the ePDG and LTE interworking. In the case where the information indicating the IP address of the PGW-C is included, the existing EPC network interfaces need not to be impacted. In the case where the information derived from the IP address of the PGW-C is included, the SBI interfaces in 5GC network need not to be impacted.

In an embodiment of the disclosure, the information derived from the IP address of the PGW-C may be an octet string filled in an information element called "PGW FQDN".

In an embodiment of the disclosure, obtaining the current subscription information of the terminal device may comprise sending, to the service provider, a first request for obtaining the current subscription information of the terminal device. Obtaining the current subscription information of the terminal device may further comprise receiving, from the service provider, a first response to the first request. The first response may comprise the information indicating or derived from the IP address of the PGW-C.

In an embodiment of the disclosure, obtaining the updated subscription information of the terminal device may comprise receiving, from the service provider, a second request for notifying the updated subscription information of the terminal device. The updated subscription information of the terminal device may comprise the information indicating or derived from the IP address of the PGW-C. Obtaining the updated subscription information of the terminal device may further comprise sending, to the service provider, a second response to the second request.

In an embodiment of the disclosure, the service provider may be a UDM.

In an embodiment of the disclosure, the first request may be an Nudm_SDM_Get request indicating a subscription data type as "UE context in SMF data". The first response may be an Nudm_SDM_Get response.

In an embodiment of the disclosure, the second request may be an Nudm_SDM_Notification request and the second response may be an Nudm_SDM_Notification response.

In an embodiment of the disclosure, the service consumer may be an AMF.

In an embodiment of the disclosure, the current or updated subscription information of the terminal device may be obtained in response to a handover of the terminal device from EPC to 5GC.

In an embodiment of the disclosure, the service consumer may be an HSS.

In an embodiment of the disclosure, the current or updated subscription information of the terminal device may be obtained in response to a handover of the terminal device from 5GC to EPC.

In an embodiment of the disclosure, the service provider may be an HSS and the service consumer is a UDM.

In an embodiment of the disclosure, the first request may be an Nhss_SDM_Get request and the first response may be an Nhss_SDM_Get response.

In an embodiment of the disclosure, the second request may be an Nhss_SDM_Notification request and the second response may be an Nhss_SDM_Notification response.

In an embodiment of the disclosure, the current or updated subscription information of the terminal device may be obtained in response to a handover of the terminal device from EPC to 5GC.

According to a sixth aspect of the disclosure, there is provided a method performed by a service provider. The method may comprise providing, to a service consumer, current or updated subscription information of a terminal device. The current or updated subscription information of the terminal device may comprise information indicating or derived from an IP address of a PGW-C that is combined together with an SMF.

In this way, it is possible to support the EPC and 5GC interworking and/or the ePDG and LTE interworking. In the case where the information indicating the IP address of the PGW-C is included, the existing EPC network interfaces need not to be impacted. In the case where the information derived from the IP address of the PGW-C is included, the SBI interfaces in 5GC network need not to be impacted.

In an embodiment of the disclosure, the information derived from the IP address of the PGW-C may be an octet string filled in an information element called "PGW FQDN".

In an embodiment of the disclosure, providing the current subscription information of the terminal device may comprise receiving, from the service consumer, a first request for obtaining the current subscription information of the terminal device. Providing the current subscription information of the terminal device may further comprise sending, to the service consumer, a first response to the first request. The first response may comprise the information indicating or derived from the IP address of the PGW-C.

In an embodiment of the disclosure, providing the updated subscription information of the terminal device may comprise sending, to the service consumer, a second request for notifying the updated subscription information of the terminal device. The updated subscription information of the terminal device may comprise the information indicating or derived from the IP address of the PGW-C. Providing the updated subscription information of the terminal device may further comprise receiving, from the service consumer, a second response to the second request.

In an embodiment of the disclosure, the service provider may be a UDM.

In an embodiment of the disclosure, the first request may be an Nudm_SDM_Get request indicating a subscription data type as "UE context in SMF data". The first response may be an Nudm_SDM_Get response.

In an embodiment of the disclosure, the second request may be an Nudm_SDM_Notification request and the second response may be an Nudm_SDM_Notification response.

In an embodiment of the disclosure, the service consumer may be an AMF.

In an embodiment of the disclosure, the current or updated subscription information of the terminal device may be provided in response to a handover of the terminal device from EPC to 5GC.

In an embodiment of the disclosure, the service consumer may be an HSS.

In an embodiment of the disclosure, the current or updated subscription information of the terminal device may be provided in response to a handover of the terminal device from 5GC to EPC.

In an embodiment of the disclosure, the service provider may be an HSS and the service consumer may be a UDM.

In an embodiment of the disclosure, the first request may be an Nhss_SDM_Get request and the first response may be an Nhss_SDM_Get response.

In an embodiment of the disclosure, the second request may be an Nhss_SDM_Notification request and the second response may be an Nhss_SDM_Notification response.

In an embodiment of the disclosure, the current or updated subscription information of the terminal device may be provided in response to a handover of the terminal device from EPC to 5GC.

According to a seventh aspect of the disclosure, there is provided a method performed by an HSS. The method may comprise obtaining, from a UDM, current or updated subscription information of a terminal device. The current or updated subscription information of the terminal device may comprise information derived from an IP address of a PGW-C that is combined together with an SMF. The method may further comprise converting the derived information back to the IP address of the PGW-C. The method may further comprise providing the IP address of the PGW-C to a network node.

In this way, it is possible to support the EPC and 5GC interworking and/or the ePDG and LTE interworking, without impacting the SBI interfaces in 5GC network.

In an embodiment of the disclosure, the information derived from the IP address of the PGW-C may be an octet string filled in an information element called "PGW FQDN".

In an embodiment of the disclosure, the network node may be an MME or an authentication, authorization and accounting (AAA).

In an embodiment of the disclosure, the IP address of the PGW-C may be provided in response to a handover of the terminal device from 5GC to EPC.

According to an eighth aspect of the disclosure, there is provided an apparatus implementing an SMF. The apparatus may comprise at least one processor and at least one memory. The at least one memory may contain instructions executable by the at least one processor, whereby the apparatus may be operative to send, to a service provider, a request for registering information related to the SMF to the service provider. The information related to the SMF may comprise information indicating or derived from an IP address of a PGW-C that is combined together with the SMF. The apparatus may be further operative to receive, from the service provider, a response to the request.

In an embodiment of the disclosure, the apparatus may be operative to perform the method according to the above first aspect.

According to a ninth aspect of the disclosure, there is provided a service provider. The service provider may comprise at least one processor and at least one memory. The at least one memory may contain instructions executable by the at least one processor, whereby the service provider may be operative to receive, from an SMF, a request for registering information related to the SMF to the service provider. The information related to the SMF may comprise information indicating or derived from an IP address of a PGW-C that is combined together with the SMF. The service provider may be further operative to send, to the SMF, a response to the request.

In an embodiment of the disclosure, the service provider may be operative to perform the method according to the above second aspect.

According to an tenth aspect of the disclosure, there is provided an apparatus implementing an AMF. The apparatus may comprise at least one processor and at least one memory. The at least one memory may contain instructions executable by the at least one processor, whereby the apparatus may be operative to send, to an NRF, a request for discovering an SMF instance satisfying one or more query parameters. The one or more query parameters may comprise an IP address of a PGW-C that is combined together with the SMF instance. The apparatus may be further operative to receive, from the NRF, a response to the request.

In an embodiment of the disclosure, the apparatus may be operative to perform the method according to the above third aspect.

According to an eleventh aspect of the disclosure, there is provided an apparatus implementing an NRF. The apparatus may comprise at least one processor and at least one memory. The at least one memory may contain instructions executable by the at least one processor, whereby the apparatus may be operative to receive, from an AMF, a request for discovering an SMF instance satisfying one or more query parameters. The one or more query parameters may comprise an IP address of a PGW-C that is combined together with the SMF instance. The apparatus may be further operative to send, to the AMF, a response to the request.

In an embodiment of the disclosure, the apparatus may be operative to perform the method according to the above fourth aspect.

According to a twelfth aspect of the disclosure, there is provided a service consumer. The service consumer may comprise at least one processor and at least one memory. The at least one memory may contain instructions executable by the at least one processor, whereby the service consumer may be operative to obtain, from a service provider, current or updated subscription information of a terminal device. The current or updated subscription information of the terminal device may comprise information indicating or derived from an IP address of a PGW-C that is combined together with an SMF.

In an embodiment of the disclosure, the service consumer may be operative to perform the method according to the above fifth aspect.

According to a thirteenth aspect of the disclosure, there is provided a service provider. The service provider may comprise at least one processor and at least one memory. The at least one memory may contain instructions executable by the at least one processor, whereby the service provider may be operative to provide, to a service consumer, current or updated subscription information of a terminal device. The current or updated subscription information of the terminal device may comprise information indicating or derived from an IP address of a PGW-C that is combined together with an SMF.

In an embodiment of the disclosure, the service provider may be operative to perform the method according to the above sixth aspect.

According to a fourteenth aspect of the disclosure, there is provided an HSS. The may comprise at least one processor and at least one memory. The at least one memory may contain instructions executable by the at least one processor, whereby the HSS may be operative to obtain, from a UDM, current or updated subscription information of a terminal device. The current or updated subscription information of the terminal device may comprise information derived from an IP address of a PGW-C that is combined together with an SMF. The HSS may be further operative to convert the derived information back to the IP address of the PGW-C. The HSS may be further operative to provide the IP address of the PGW-C to a service consumer.

In an embodiment of the disclosure, the HSS may be operative to perform the method according to the above seventh aspect.

According to a fifteenth aspect of the disclosure, there is provided a computer program product. The computer program product may comprise instructions which when executed by at least one processor, cause the at least one processor to perform the method according to any of the above first to seventh aspects.

According to a sixteenth aspect of the disclosure, there is provided a computer readable storage medium. The computer readable storage medium may comprise instructions which when executed by at least one processor, cause the at least one processor to perform the method according to any of the above first to seventh aspects.

According to a seventeenth aspect of the disclosure, there is provided an apparatus implementing an SMF. The apparatus may comprise a sending module for sending, to a service provider, a request for registering information related to the SMF to the service provider. The information related to the SMF may comprise information indicating or derived from an IP address of a PGW-C that is combined together with the SMF. The apparatus may further comprise a reception module for receiving, from the service provider, a response to the request.

According to an eighteenth aspect of the disclosure, there is provided a service provider. The service provider may comprise a reception module for receiving, from an SMF, a request for registering information related to the SMF to the service provider. The information related to the SMF may comprise information indicating or derived from an IP address of a PGW-C that is combined together with the SMF. The service provider may further comprise a sending module for sending, to the SMF, a response to the request.

According to a nineteenth aspect of the disclosure, there is provided an apparatus implementing an AMF. The apparatus may comprise a sending module for sending, to an NRF, a request for discovering an SMF instance satisfying one or more query parameters. The one or more query parameters may comprise an IP address of a PGW-C that is combined together with the SMF instance. The apparatus may further comprise a reception module for receiving, from the NRF, a response to the request.

According to a twentieth aspect of the disclosure, there is provided an apparatus implementing an NRF. The apparatus may comprise a reception module for receiving, from an AMF, a request for discovering an SMF instance satisfying one or more query parameters. The one or more query parameters may comprise an IP address of a PGW-C that is combined together with the SMF instance. The apparatus may further comprise a sending module for sending, to the AMF, a response to the request.

According to a twenty-first aspect of the disclosure, there is provided a service consumer. The service provider may comprise an obtaining module for obtaining, from a service provider, current or updated subscription information of a terminal device. The current or updated subscription information of the terminal device may comprise information indicating or derived from an IP address of a PGW-C that is combined together with an SMF.

According to a twenty-second aspect of the disclosure, there is provided a service provider. The service provider may comprise a provision module for providing, to a service consumer, current or updated subscription information of a terminal device. The current or updated subscription information of the terminal device may comprise information indicating or derived from an IP address of a PGW-C that is combined together with an SMF.

According to a twenty-third aspect of the disclosure, there is provided an HSS. The HSS may comprise an obtaining module for obtaining, from a UDM, current or updated subscription information of a terminal device. The current or updated subscription information of the terminal device may comprise information derived from an IP address of a PGW-C that is combined together with an SMF. The HSS may further comprise a conversion module for converting the derived information back to the IP address of the PGW-C. The HSS may further comprise a provision module for providing the IP address of the PGW-C to a service consumer.

According to a twenty-fourth aspect of the disclosure, there is provided a method implemented in a communication system including an SMF and a service provider. The method may comprise steps of the methods according to the above first and second aspects.

According to a twenty-fifth aspect of the disclosure, there is provided a method implemented in a communication system including an AMF and an NRF. The method may comprise steps of the methods according to the above third and fourth aspects.

According to a twenty-sixth aspect of the disclosure, there is provided a method implemented in a communication system including a service consumer and a service provider. The method may comprise steps of the methods according to the above fifth and sixth aspects.

According to a twenty-seventh aspect of the disclosure, there is provided a method implemented in a communication system including an HSS and a service consumer. The method may comprise steps of the method according to the above seventh aspect. The method may further comprise, at the service consumer, obtaining the IP address of the PGW-C from the HSS.

According to a twenty-eighth aspect of the disclosure, there is provided a communication system including an SMF according to the above eighth or seventeenth aspect and a service provider according to the above ninth or eighteenth aspect.

According to a twenty-ninth aspect of the disclosure, there is provided a communication system including an AMF according to the above tenth or nineteenth aspect and an NRF according to the above eleventh or twentieth aspect.

According to a thirtieth aspect of the disclosure, there is provided a communication system including a service consumer according to the above twelfth or twenty-first aspect and a service provider according to the above thirteenth or twenty-second aspect.

According to a thirty-first aspect of the disclosure, there is provided a communication system including an HSS according to the above fourteenth or twenty-third aspect and a service consumer. The service consumer may be configured to obtain the IP address of the PGW-C from the HSS.

BRIEF DESCRIPTION OF THE DRAWINGS

These and other objects, features and advantages of the disclosure will become apparent from the following detailed description of illustrative embodiments thereof, which are to be read in connection with the accompanying drawings.

FIG. 7 is a flowchart illustrating a method performed by an SMF according to an embodiment of the disclosure;

FIG. 8 is a flowchart illustrating a method performed by a service provider according to an embodiment of the disclosure;

FIG. 9 is a flowchart illustrating an exemplary process according to an embodiment of the disclosure;

FIG. 10 is a flowchart illustrating an exemplary process according to an embodiment of the disclosure;

FIG. 11 is a flowchart illustrating a method performed by an AMF according to an embodiment of the disclosure;

FIG. 12 is a flowchart illustrating a method performed by an NRF according to an embodiment of the disclosure;

FIG. 13 is a flowchart illustrating an exemplary process according to an embodiment of the disclosure;

FIG. 14 is a flowchart illustrating a method performed by a service consumer according to an embodiment of the disclosure;

FIG. 15 is a flowchart for explaining the method of FIG. 14;

FIG. 16 is a flowchart for explaining the method of FIG. 14;

FIG. 17 is a flowchart illustrating a method performed by a service provider according to an embodiment of the disclosure;

FIG. 18 is a flowchart for explaining the method of FIG. 17;

FIG. 19 is a flowchart for explaining the method of FIG. 17;

FIG. 20 is a flowchart illustrating an exemplary process according to an embodiment of the disclosure;

FIG. 21 is a flowchart illustrating an exemplary process according to an embodiment of the disclosure;

FIG. 34 is a block diagram showing a service consumer according to an embodiment of the disclosure;

FIG. 35 is a block diagram showing a service provider according to an embodiment of the disclosure; and FIG. 36 is a block diagram showing an HSS according to an embodiment of the disclosure.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

For simplicity, the SMF in the following description and figures refers to the combined PGW-C+SMF if not explicitly mentioned.

At EPC to 5GC mobility, the AMF discovers the SMF instance by an network function (NF)/NF service discovery procedure using query parameter "PGW FQDN (fully qualified domain name)" as specified in TS 23.502. In order to do so, Before mobility, the following needs to be prepared:
the SMF first registers the associated "PGW FQDN" to NF repository function (NRF) as described in section 2.1.3.

When UE establishes PDN connection from EPC/ePDG, the PGW is required to store its FQDN to the HSS+UDM as described in section 2.1.4.

During EPC to 5GC mobility, the AMF obtains the "PGW FQDN" as follows:

At EPS to 5GS mobility via N26, the AMF gets the PGW FQDN over N26, refer to the following:

TS 23.502
4.11.1 N26 based Interworking Procedures
4.11.1.1 General
. . .

During interworking from EPS to 5GS, as the PGW-C+SMF may have different IP addresses when being accessed over S5/S8 and N11/N16 respectively, the AMF shall discover the SMF instance by an NF/NF service discovery procedure using the FQDN for the S5/S8 interface received from the MME as a query parameter.

At EPC/ePDG to 5GS handover, the AMF gets from the UDM the "PGW FQDN" which was provided by the combined PGW-C+SMF if the PDN connection was established via EPC/ePDG as described in section 2.1.4.1.

Figure 4:
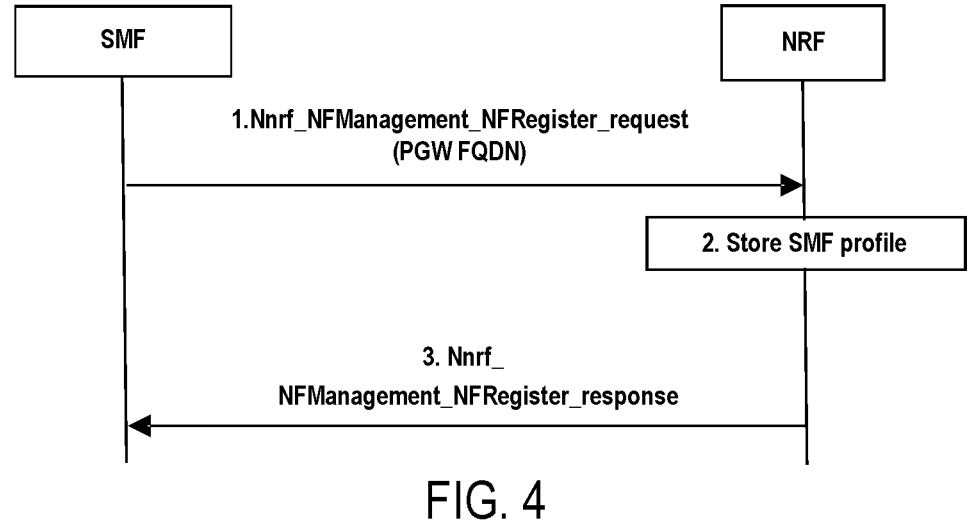
FIG. 4 is a flowchart illustrating the existing registration of SMF to NRF.

Thus, in order to support EPC and 5GC interworking, the SMF first registers its associated "PGW FQDN" as part of the "SMF profile" to NRF in Nnrf_NFManagement_N-FRegister, as shown in FIG. 4.

To support the interworking between ePDG/EPC and 5GS, and for the interworking between EPC/E-UTRAN and 5GS without N26, the PGW identity of the selected PGW-C+SMF is provided to HSS or UDM during the initial PDN/PDU session establishment. The HSS and UDM will synchronize the PGW identity for the possible mobility between EPC and 5GC. Then during the mobility between ePDG/EPC and 5GS, or between EPC/E-UTRAN and 5GS without N26, the SMF is selected based on the PGW identity provided by HSS+UDM.

When the UE establishes a PDN connection in EPC network, the PGW identity of the selected PGW-C+SMF is provided to the HSS in the same way as the existing EPC procedure specified in step C.1 in clause 7.2.4 of TS 23.402 or step 25 in clause 5.3.2.1 of TS 23.401. In the existing EPC standard, the PGW identity provided to the HSS can be either an IP address or an FQDN as defined in clause 9.2.3.2.2 of TS 29.273:

TS 29.273
9.2.3.2.2 MIP6-Agent-Info
The identity of PDN GW is either an IP address transported in MIP-Home-Agent-Address or an FQDN transported in MIP-Home-Agent-Host.

Figure 5:
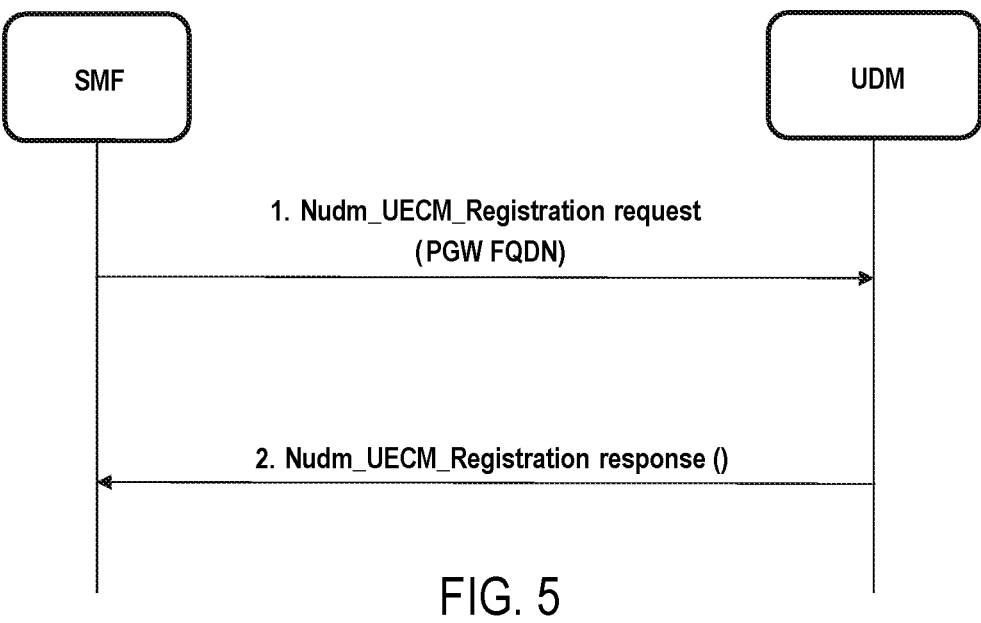
FIG. 5 is a flowchart illustrating the existing registration of SMF to UDM.

When the UE connects to the AMF over 3GPP/new radio (NR) access and establishes a PDU session, the selected SMF registers its associated PGW FQDN to UDM in Nudm_UECM_Registration request over N10 service-based interface (SBI) interface, as shown in FIG. 5.

In 3GPP Release 16, when the UE connects to the ePDG over non-3GPP access and establishes a PDN connection, the SMF can directly report its PGW FQDN in Nudm_UECM_Registration request over N10 SBI interface without using S6b interface.

Note that "PGW IP address" is not provided in Nudm_UECM_Registration to the UDM in the current standard (see clause 5.2.3.2.1 from TS 23.502 as below).
5.2.3.2.1 Nudm_UECM_Registration service operation
Inputs, Required: NF ID, SUPI, PEI, NF Type, Access Type (if NF Type is AMF, SMSF), RAT Type (if NF Type is AMF), PDU Session ID (if NF Type is SMF). If NF Type is SMF: DNN or Indication of Emergency Services, S-NSSAI, PGW-C+SMF FQDN for S5/S8 if the PDU Session supports EPS interworking, Serving PLMN ID. If NF type is AMF and Access Type is 3GPP access: Registration type. If NF type is SMSF: SMSF MAP address and/or Diameter address, Serving PLMN ID.

Note that the "PGW-C+SMF FQDN for S5/S8" actually refers to the "PGW FQDN" which can be used for S5/S8 or S2b.

HSS and UDM can be deployed as a combined network function HSS+UDM. In such deployment, HSS and UDM synchronize the PGW Info based on the internal interface.

Figure 6:
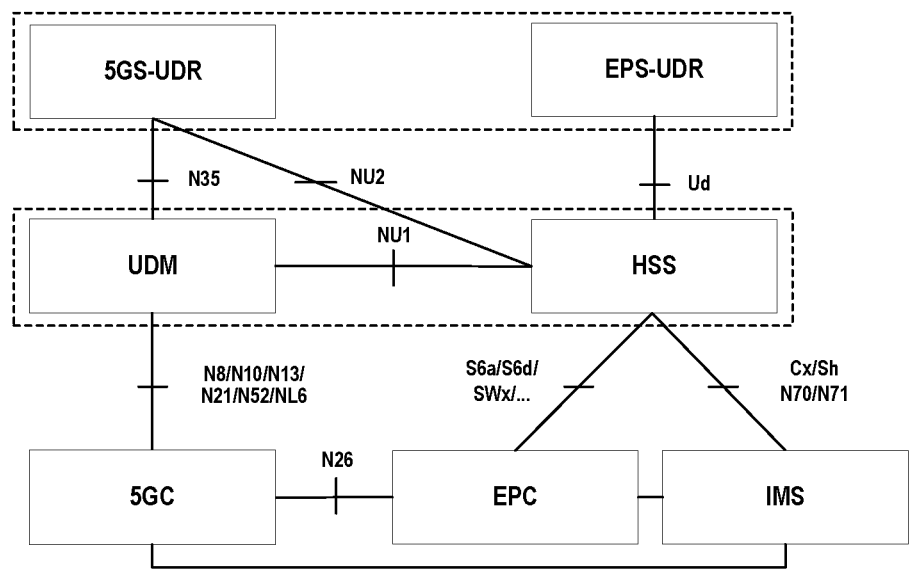
FIG. 6 is a diagram illustrating the architecture for direct UDM-HSS interworking.

3GPP TS23.632 also defines the SBI interface for interworking between HSS and UDM when they are deployed in separate network functions as the specification of User Data Interworking, Coexistence and Migration (UDICOM). FIG. 6 (FIGS. 4.1-2 of TS 23.632) illustrates the architecture for direct UDM-HSS interworking in reference point representation. Only "PGW FQDN" is defined between HSS and UDM for the EPC and 5GC interworking as below.

TS 23.632
5.3.4 Support for PDU session continuity during intersystem mobility procedures
During mobility from 5GC to EPC or EPC/ePDG, or mobility from 5GC-N3IWF to EPC, or mobility from EPC/ePDG to EPC, the HSS uses the Nudm_SDM_Get service operation to retrieve the PGW-C+SMF FQDN for S5/S8/S2b interface from UDM, and subscribes to be notified using Nudm_SDM_Subscribe when the Intersystem continuity context data or the UE context in SMF data are modified. During mobility from EPC or EPC/ePDG to 5GC, or mobility from EPC to 5GC-N3IWF, the UDM uses the Nhss_SDM_Get service operation to retrieve the PGW-C+SMF FQDN for S5/S8 interface from HSS and subscribes to be notified using Nhss_SDM_Subscribe when the data requested is modified.

Note that "PGW-C+SMF FQDN for S5/S8" actually refers to the "PGW FQDN" which can be used for either S5/S8 or S2b.

In the existing EPC network, many operators have deployed the ePDG and EPC interworking based on the PGW IP address as the PGW identity. The ePDG and MME selects the PGW based on the PGW IP address during the handover between non-3GPP and 3GPP/long term evolution (LTE) access. That is, during the handover between non-3GPP and 3GPP access, PGW FQDN is not used by ePDG or MME to determine the PGW.

For operators that do not use PGW FQDN as PGW identity in the EPC network today, the following problems are observed:

Problem-1: At EPC to 5GC mobility (EPS to 5GS with/without N26, non-3GPP/ePDG to 5GS), if only PGW IP address is available at EPC and provided to 5GC, then the AMF will not be able to find the SMF instance as the query parameter "PGW FQDN" is not available. Therefore, EPC to 5GC mobility will fail.

Problem-2: At 5GC to EPC mobility (5GS to EPS without N26, 5GC/3GPP to ePDG/EPC), the SMF only registers PGW FQDN in UDM via N10 based on the current 5GC standard. Then the ePDG or MME will not be able to get the PGW IP address from HSS. Therefore, 5GC to EPC mobility (without N26, 5GC/3GPP to ePDG/EPC) will fail.

Problem-3: At ePDG/EPC to LTE/EPC mobility, if N10 is used instead of S6b, the SMF only registers PGW FQDN in UDM via N10, then the MME will not be able to get the PGW IP address from HSS. Therefore ePDG/EPC to LTE/EPC mobility will fail.

Figures 1, 2:
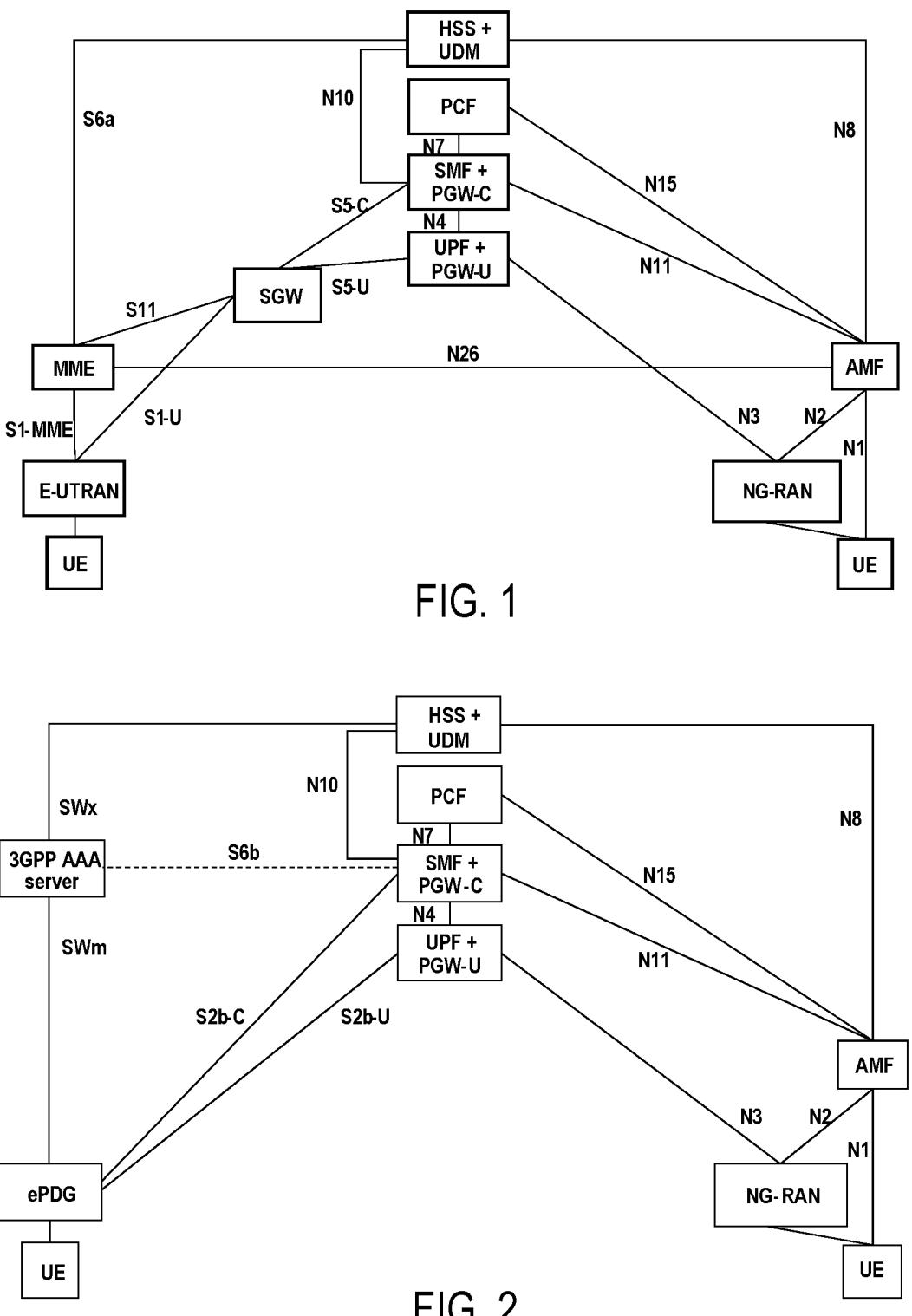
FIG. 1 is a diagram illustrating the non-roaming architecture for interworking between 5GS and EPC/E-UTRAN.
FIG. 2 is a diagram illustrating the non-roaming architecture for interworking between ePDG/EPC and 5GS.
Figure 3:
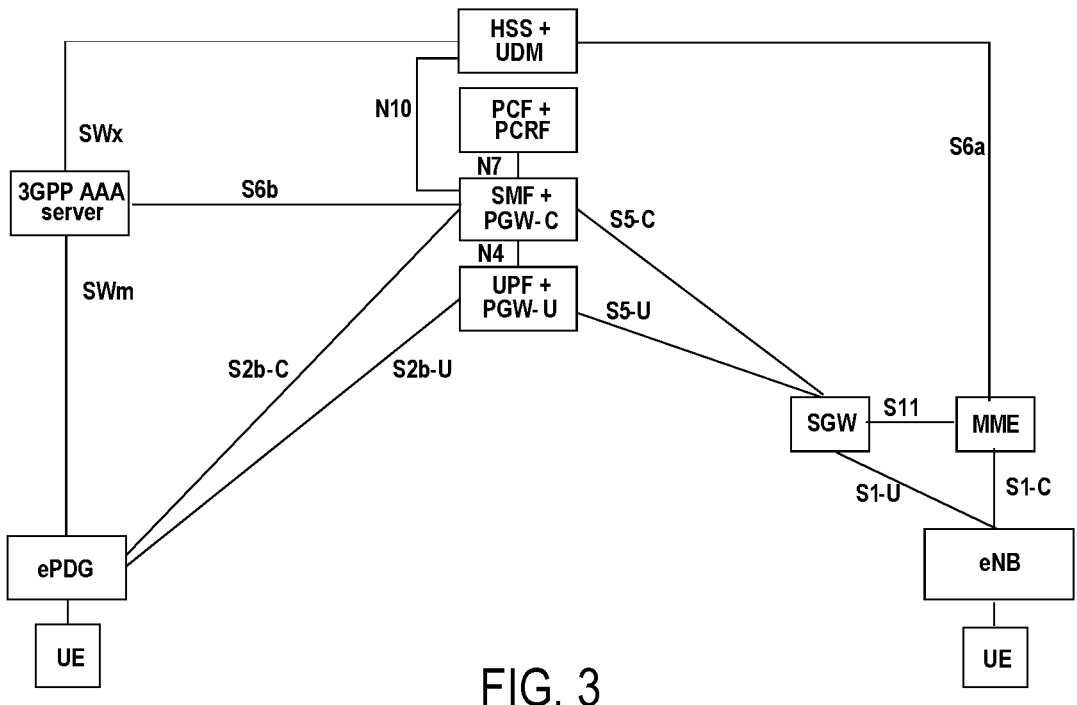
FIG. 3 is a diagram illustrating the non-roaming architecture for interworking between ePDG/EPC and EPC/E-UTRAN.

The present disclosure proposes an improved solution for mobility between different communication systems. For example, the solution may be applied to any one of the scenarios shown in FIG. 1 to FIG. 3. Hereby, 3GPP TS 23.501 is incorporated herein by reference in its entirety.

The basic idea of a first embodiment of the disclosure is to introduce "PGW IP address" into the SBI interfaces between 5GC NFs for EPC and 5GC mobility: for example, a new attribute of "PGW IP address" is added by the SMF when registration in NRF, so that the AMF can use the "PGW IP address" as query parameter to discover the SMF instance; a new attribute of "PGW IP address" (if available) is used by AMF when discovery of the SMF instance; a new attribute of "PGW IP address" is added by the SMF when registration in UDM; a new attribute of "PGW IP address" (if available) is included by UDM when sending the PGW Identity to AMF; a new attribute of "PGW IP address" (if available) is added between HSS and UDM interface (if UDICOM is used). With this embodiment, it is possible to support the EPC and 5GC interworking, without impacting the existing EPC network interfaces.

Alternatively, the basic idea of a second embodiment is to introduce specific logics in SMF and HSS to support EPC and 5GC interworking without impacting the SBI interfaces in 5GC network, by filling in the data body of the PGW FQDN with the PGW IP address as a string to avoid introducing explicitly a new attribute on the SBI interface for 5GC. Compared with the above first embodiment, during SMF NF registration to NRF, the SMF converts "PGW IP address" into octet string and fill the "PGW FQDN" with the converted string; during SMF registration to UDM, the SMF converts "PGW IP address" into octet string and fill the "PGW FQDN" with the converted string; when HSS updates UDM for PGW Info, HSS converts "PGW IP address" into octet string and fill the "PGW FQDN" with the converted string; when HSS interacts with MME or AAA, the HSS converts the "PGW FQDN" received from UDM into "PGW IP address" based on configuration.

The term "terminal device" used herein may also be referred to as, for example, device, access terminal, UE, mobile station, mobile unit, subscriber station, or the like. It may refer to any end device that can access a wireless communication network and receive services therefrom. By way of example and not limitation, the terminal device may include a portable computer, an image capture terminal device such as a digital camera, a gaming terminal device, a music storage and playback appliance, a mobile phone, a cellular phone, a smart phone, a tablet, a wearable device, a personal digital assistant (PDA), or the like.

In an Internet of things (IoT) scenario, a terminal device may represent a machine or other device that performs monitoring and/or measurements, and transmits the results of such monitoring and/or measurements to another terminal device and/or a network equipment. In this case, the terminal device may be a machine-to-machine (M2M) device, which may, in a 3rd generation partnership project (3GPP) context, be referred to as a machine-type communication (MTC) device. Particular examples of such machines or devices may include sensors, metering devices such as power meters, industrial machineries, bikes, vehicles, or home or personal appliances, e.g. refrigerators, televisions, personal wearables such as watches, and so on.

As used herein, the term "communication system" refers to a system following any suitable communication standards, such as the first generation (1G), 2G, 2.5G, 2.75G, 3G, 4G, 4.5G, 5G communication protocols, and/or any other protocols either currently known or to be developed in the future. Furthermore, the communications between a terminal device and a network node in the communication system may be performed according to any suitable generation communication protocols, including, but not limited to, 1G, 2G, 2.5G, 2.75G, 3G, 4G, 4.5G, 5G communication protocols, and/or any other protocols either currently known or to be developed in the future. In addition, the specific terms used herein do not limit the present disclosure only to the communication system related to the specific terms, which however can be more generally applied to other communication systems.

Hereinafter, the solution of the present disclosure will be described in detail with reference to FIGS. 7-34. FIG. 7 is a flowchart illustrating a method performed by an SMF according to an embodiment of the disclosure. Note that the network function or network node (or entity) mentioned in this document may be implemented either as a network element on a dedicated hardware, as a software instance running on a dedicated hardware, or as a virtualized function instantiated on an appropriate platform, e.g. on a cloud infrastructure. At block 702, the SMF sends, to a service provider, a request for registering information related to the SMF to the service provider. The information related to the SMF comprises information indicating or derived from an IP address of a PGW-C that is combined together with the SMF. For example, the information derived (or converted) from the IP address of the PGW-C may be an octet string filled in an information element called "PGW FQDN". Since the PGW-C is combined with the SMF, the IP address of the PGW-C can also be represented as PGW-C+SMF IP address. At block 704, the SMF receives, from the service provider, a response to the request.

As a first option, the service provider may be an NRF. For this option, the information related to the SMF may be a profile of the SMF. The request may be an Nnrf_NFManagement_NFRegister_request and the response may be an Nnrf_NFManagement_NFRegister_response.

As a second option, the service provider may be a UDM. For this option, the SMF may be registered as a NF serving a PDU session for a terminal device. The request may be an Nudm_UECM_Registration request and the response may be an Nudm_UECM_Registration response. For both options mentioned above, the request may be sent in response to a PDU session being established for a terminal device.

With the method of FIG. 7, it is possible to support the EPC and 5GC interworking and/or the ePDG and LTE interworking. In the case where the information indicating the IP address of the PGW-C is included, the existing EPC network interfaces need not to be impacted since the new attribute "PGW IP address" is added on the SBI interface between SMF and NRF/UDM. In the case where the information derived from the IP address of the PGW-C is included, the SBI interfaces in 5GC network need not to be impacted since the existing attribute "PGW FQDN" is reused to carry the information (e.g. the octet string) derived from the IP address of the PGW-C.

FIG. 8 is a flowchart illustrating a method performed by a service provider according to an embodiment of the disclosure. At block 802, the service provider receives, from an SMF, a request for registering information related to the SMF to the service provider. The information related to the SMF comprises information indicating or derived from an IP address of a PGW-C that is combined together with the SMF. For example, the information derived (or converted) from the IP address of the PGW-C may be an octet string filled in an information element called "PGW FQDN". At block 804, the service provider sends, to the SMF, a response to the request.

As a first option, the service provider may be an NRF. For this option, the information related to the SMF may be a profile of the SMF. The request may be an Nnrf_NFManagement_NFRegister_request and the response may be an Nnrf_NFManagement_NFRegister_response.

As a second option, the service provider may be a UDM. For this option, the SMF may be registered as a NF serving a PDU session for a terminal device. The request may be an Nudm_UECM_Registration request and the response may be an Nudm_UECM_Registration response. For both options mentioned above, the request may be received in response to a PDU session being established for a terminal device.

With the method of FIG. 8, it is possible to support the EPC and 5GC interworking and/or the ePDG and LTE interworking. In the case where the information indicating the IP address of the PGW-C is included, the existing EPC network interfaces need not to be impacted since the new attribute "PGW IP address" is added on the SBI interface between SMF and NRF/UDM. In the case where the information derived from the IP address of the PGW-C is included, the SBI interfaces in 5GC network need not to be impacted since the existing attribute "PGW FQDN" is reused to carry the information (e.g. the octet string) derived from the IP address of the PGW-C.

FIG. 9 is a flowchart illustrating an exemplary process according to an embodiment of the disclosure. In this process, the "PGW IP address" is added to SMF profile when SMF registers itself to NRF. As shown, at step 1, the SMF registers the "PGW IP address" (if available) as part of the "SMF profile" to the NRF by sending Nnrf_NFManagement_NFRegister_request. The SMF profile may be stored at the NRF. At step 2, the NRF sends an Nnrf_NFManagement_NFRegister_response to the SMF.

FIG. 10 is a flowchart illustrating an exemplary process according to an embodiment of the disclosure. In this process, the "PGW IP address" is added when PGW-C+SMF registers in UDM. As shown, at step 1, the SMF registers "PGW IP address" (if available) to UDM by sending an Nudm_UECM_Registration request to the UDM. At step 2, the UDM sends an Nudm_UECM_Registration response to the PGW-C+SMF.

FIG. 11 is a flowchart illustrating a method performed by an AMF according to an embodiment of the disclosure. At block 1102, the AMF sends, to an NRF, a request for discovering an SMF instance satisfying one or more query parameters. The one or more query parameters comprise an IP address of a PGW-C that is combined together with the SMF instance. For example, the request may be sent in response to a handover of a terminal device from EPC to 5GC. The request may be an Nnrf_NFDiscovery_Request. The IP address of the PGW-C may be obtained from an MME or a combined entity of an HSS and a UDM. At block 1104, the AMF receives, from the NRF, a response to the request. For example, if there exists the SMF instance satisfying the one or more query parameters, the response may comprise information related to the SMF instance. Note that the number of the discovered SMF instances may be more than one. With the method of FIG. 11, it is possible to support the EPC and 5GC interworking without impacting the existing EPC network.

FIG. 12 is a flowchart illustrating a method performed by an NRF according to an embodiment of the disclosure. At block 1202, the NRF receives, from an AMF, a request for discovering an SMF instance satisfying one or more query parameters. The one or more query parameters comprise an IP address of a PGW-C that is combined together with the SMF instance. For example, the request may be received in response to a handover of a terminal device from EPC to 5GC. The request may be an Nnrf_NFDiscovery_Request. The NRF may search, from the stored SMF instances, the SMF instance satisfying the one or more query parameters. At block 1204, the NRF sends, to the AMF, a response to the request. For example, if there exists the SMF instance satisfying the one or more query parameters, the response may comprise information related to the SMF instance. With the method of FIG. 12, it is possible to support the EPC and 5GC interworking without impacting the existing EPC network.

FIG. 13 is a flowchart illustrating an exemplary process according to an embodiment of the disclosure. In this process, the "PGW IP address" is added as a query parameter when AMF discovers SMF instance at EPC to 5GC mobility. As shown, at step 1, at EPC to 5GC mobility, if "PGW FQDN" is not available, the AMF uses "PGW IP address" (if available) to discover the SMF instance. The NRF may authorize the requested NF service discovery. At step 2, the NRF sends an Nnrf_NFDiscovery_Response to the AMF.

FIG. 14 is a flowchart illustrating a method performed by a service consumer according to an embodiment of the disclosure. At block 1402, the service consumer obtains, from a service provider, current or updated subscription information of a terminal device. The current or updated subscription information of the terminal device comprises information indicating or derived from an IP address of a PGW-C that is combined together with an SMF. For example, the information derived (or converted) from the IP address of the PGW-C may be an octet string filled in an information element called "PGW FQDN".

For example, the obtaining of the current subscription information of the terminal device may be implemented as blocks 1504 and 1506 of FIG. 15. At block 1504, the service consumer sends, to the service provider, a first request for obtaining the current subscription information of the terminal device. At block 1506, the service consumer receives, from the service provider, a first response to the first request. The first response comprises the information indicating or derived from the IP address of the PGW-C.

For example, the obtaining of the updated subscription information of the terminal device may be implemented as blocks 1608 and 1610 of FIG. 16. At block 1608, the service consumer receives, from the service provider, a second request for notifying the updated subscription information of the terminal device. The updated subscription information of the terminal device comprises the information indicating or derived from the IP address of the PGW-C. At block 1610, the service consumer sends, to the service provider, a second response to the second request.

As a first option, the service provider may be a UDM and the service consumer may be an AMF or an HSS. For this option, the first request may be an Nudm_SDM_Get request indicating a subscription data type as "UE context in SMF data" and the first response may be an Nudm_SDM_Get response. The second request may be an Nudm_SDM_Notification request and the second response may be an Nudm_SDM_Notification response. In the case where the service consumer is an AMF, the current or updated subscription information of the terminal device may be obtained in response to a handover of the terminal device from EPC to 5GC. Note that the information derived from the IP address of the PGW-C (which is filled in the "PGW PGW FQDN") can be transparent to the AMF and the UDM when the service consumer is the AMF. In the case where the service consumer is an HSS, the current or updated subscription information of the terminal device may be obtained in response to a handover of the terminal device from 5GC to EPC.

As a second option, the service provider may be an HSS and the service consumer may be a UDM. For this option, the first request may be an Nhss_SDM_Get request and the first response may be an Nhss_SDM_Get response. The second request may be an Nhss_SDM_Notification request and the second response may be an Nhss_SDM_Notification response. The current or updated subscription information of the terminal device may be obtained in response to a handover of the terminal device from EPC to 5GC.

With the method of FIG. 14, it is possible to support the EPC and 5GC interworking and/or the ePDG and LTE interworking. In the case where the information indicating the IP address of the PGW-C is included, the existing EPC network interfaces need not to be impacted since the new attribute "PGW IP address" is added on the SBI interface between the service consumer and the service provider. In the case where the information derived from the IP address of the PGW-C is included, the SBI interfaces in 5GC network need not to be impacted since the existing attribute "PGW FQDN" is reused to carry the information (e.g. the octet string) derived from the IP address of the PGW-C.

FIG. 17 is a flowchart illustrating a method performed by a service provider according to an embodiment of the disclosure. At block 1702, the service provider provides, to a service consumer, current or updated subscription information of a terminal device. The current or updated subscription information of the terminal device comprises information indicating or derived from an IP address of a PGW-C that is combined together with an SMF. For example, the information derived (or converted) from the IP address of the PGW-C may be an octet string filled in an information element called "PGW FQDN".

For example, the providing of the current subscription information of the terminal device may be implemented as blocks 1804 and 1806 of FIG. 18. At block 1804, the service provider receives, from the service consumer, a first request for obtaining the current subscription information of the terminal device. At block 1806, the service provider sends, to the service consumer, a first response to the first request. The first response comprises the information indicating or derived from the IP address of the PGW-C.

For example, the providing of the updated subscription information of the terminal device may be implemented as blocks 1908 and 1910 of FIG. 19. At block 1908, the service provider sends, to the service consumer, a second request for notifying the updated subscription information of the terminal device. The updated subscription information of the terminal device comprises the information indicating or derived from the IP address of the PGW-C. At block 1910, the service provider receives, from the service consumer, a second response to the second request.

As a first option, the service provider may be a UDM and the service consumer may be an AMF or an HSS. For this option, the first request may be an Nudm_SDM_Get request indicating a subscription data type as "UE context in SMF data" and the first response may be an Nudm_SDM_Get response. The second request may be an Nudm_SDM_Notification request and the second response may be an Nudm_SDM_Notification response. In the case where the service consumer is an AMF, the current or updated subscription information of the terminal device may be provided in response to a handover of the terminal device from EPC to 5GC. Note that the information derived from the IP address of the PGW-C(which is filled in the "PGW PGW FQDN") can be transparent to the AMF and the UDM when the service consumer is the AMF. In the case where service consumer is an HSS, the current or updated subscription information of the terminal device may be provided in response to a handover of the terminal device from 5GC to EPC.

As a second option, the service provider may be an HSS and the service consumer may be a UDM. For this option, the first request may be an Nhss_SDM_Get request and the first response may be an Nhss_SDM_Get response. The second request may be an Nhss_SDM_Notification request and the second response may be an Nhss_SDM_Notification response. The current or updated subscription information of the terminal device may be provided in response to a handover of the terminal device from EPC to 5GC.

With the method of FIG. 17, it is possible to support the EPC and 5GC interworking and/or the ePDG and LTE interworking. In the case where the information indicating the IP address of the PGW-C is included, the existing EPC network interfaces need not to be impacted since the new attribute "PGW IP address" is added on the SBI interface between the service consumer and the service provider. In the case where the information derived from the IP address of the PGW-C is included, the SBI interfaces in 5GC network need not to be impacted since the existing attribute "PGW FQDN" is reused to carry the information (e.g. the octet string) derived from the IP address of the PGW-C.

FIGS. 20-21 are flowcharts illustrating exemplary processes according to an embodiment of the disclosure. In the processes of FIGS. 20-21, "PGW IP address" is added when UDM sends PGW Info to AMF. In the process of FIG. 20, "PGW IP address" (if available) is added in UE Context in SMF Data Retrieval response towards AMF. As shown, at step 1, the AMF sends to the UDM an Nudm_SDM_Get request indicating a subscription data type as "UE context in SMF data". At step 2, the UDM sends an Nudm_SDM_Get response to the AMF.

In the process of FIG. 21, "PGW IP address" (if available) is added in UE Context in SMF Data Update Notification request towards AMF. As shown, at step 1, the UDM sends an Nudm_SDM_Notification request to the AMF. At step 2, the AMF sends an Nudm_SDM_Notification response to the UDM.

Figures 22, 23, 24:
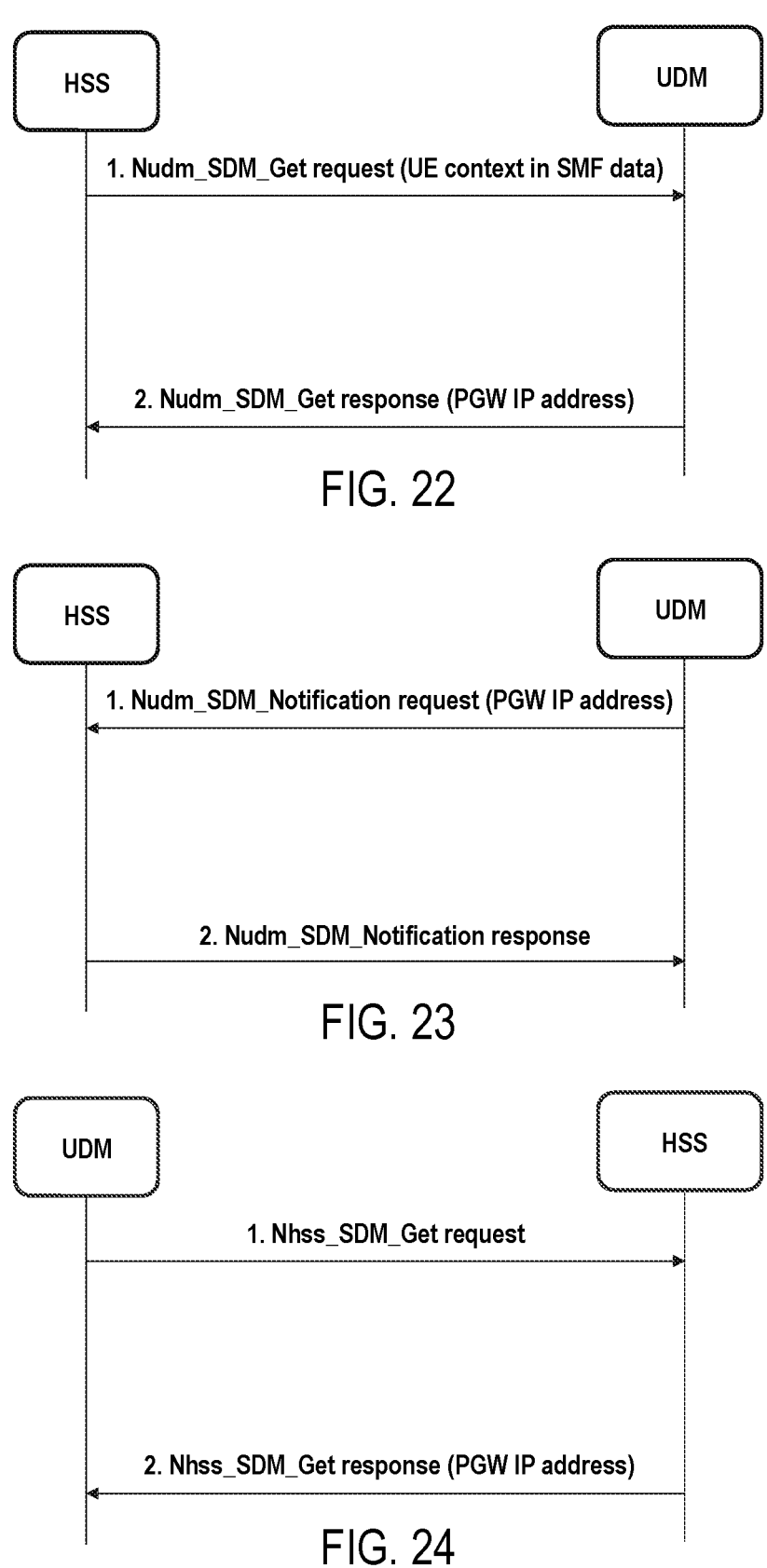
FIG. 22 is a flowchart illustrating an exemplary process according to an embodiment of the disclosure.
FIG. 23 is a flowchart illustrating an exemplary process according to an embodiment of the disclosure.
FIG. 24 is a flowchart illustrating an exemplary process according to an embodiment of the disclosure.

FIGS. 22-25 are flowcharts illustrating exemplary processes according to an embodiment of the disclosure. In the processes of FIGS. 22-25, "PGW IP address" is added between HSS and UDM interface. In the process of FIG. 22, HSS fetches PGW Info from UDM during mobility from 5GS to EPC/ePDG. As shown, at step 1, the HSS sends to the UDM an Nudm_SDM_Get request indicating a subscription data type as "UE context in SMF data". At step 2, the UDM sends an Nudm_SDM_Get response to the HSS.

In the process of FIG. 23, PGW Info is notified from UDM to HSS if UDM receives PGW info update and HSS subscribed for notification. As shown, at step 1, the UDM sends an Nudm_SDM_Notification request to the HSS. At step 2, the HSS sends an Nudm_SDM_Notification response to the UDM.

In the process of FIG. 24, UDM fetches PGW Info from HSS during mobility from EPC/ePDG to 5GS. As shown, at step 1, the UDM sends an Nhss_SDM_Get request to the HSS. At step 2, the HSS sends an Nhss_SDM_Get response to the UDM.

Figure 25:
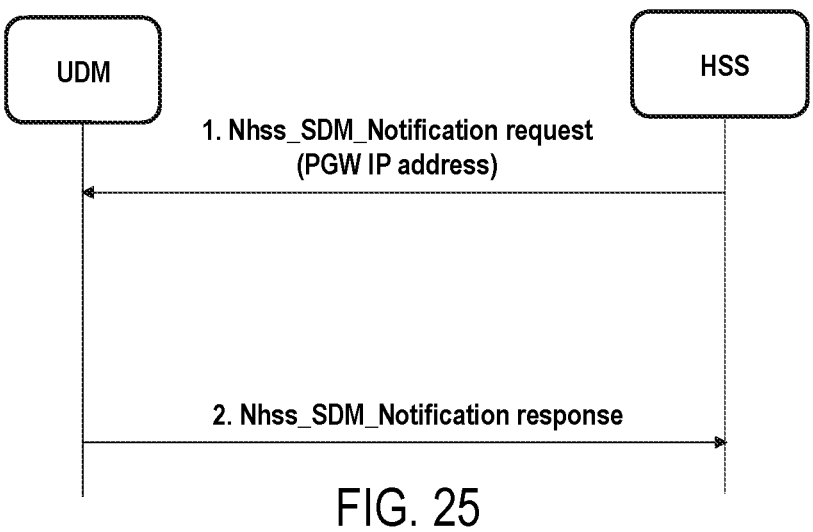
FIG. 25 is a flowchart illustrating an exemplary process according to an embodiment of the disclosure.

In the process of FIG. 25, PGW Info is notified from HSS to UDM if HSS receives update from MME or AAA and if UDM subscribed for notification. As shown, the HSS sends an Nhss_SDM_Notification request to the UDM. At step 2, the UDM sends an Nhss_SDM_Notification response to the HSS.

Figure 26:
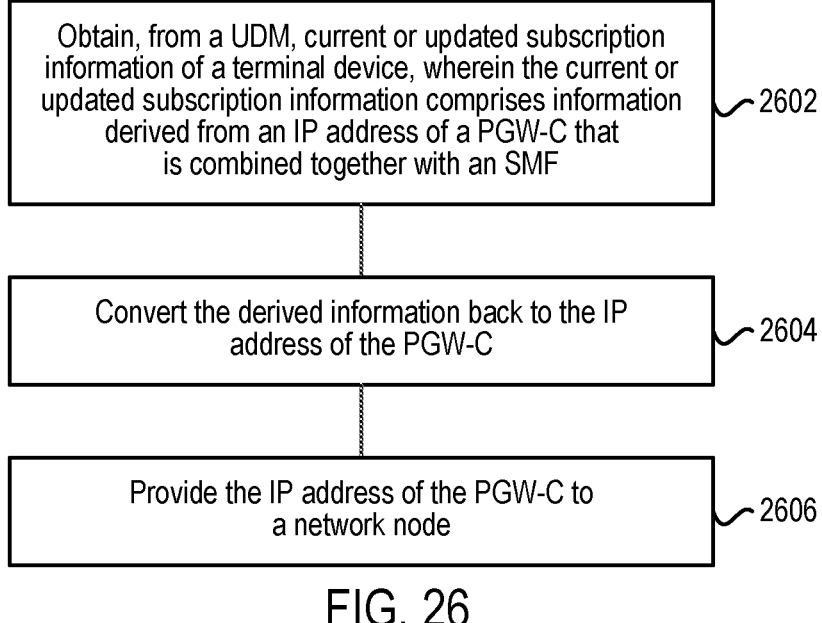
FIG. 26 is a flowchart illustrating a method performed by an HSS according to an embodiment of the disclosure.

FIG. 26 is a flowchart illustrating a method performed by an HSS according to an embodiment of the disclosure. At block 2602, the HSS obtains, from a UDM, current or updated subscription information of a terminal device. The current or updated subscription information of the terminal device comprises information derived from an IP address of a PGW-C that is combined together with an SMF. For example, the information derived (or converted) from the IP address of the PGW-C may be an octet string filled in an information element called "PGW FQDN". For example, the octet string may be generated by converting the IP address of the PGW-C to the octet string according to a predetermined mapping rule. Block 2602 may be implemented by using the method of FIG. 14.

At block 2604, the HSS converts the derived information back to the IP address of the PGW-C. For example, the derived information (e.g. the octet string) may be converted back to the IP address of the PGW-C according to the predetermined mapping rule. Various other techniques may be used as long as the conversion between the octet string and the IP address is reversible. At block 2606, the HSS provides the IP address of the PGW-C to a network node. For example, the network node may be an MME or an AAA. The IP address of the PGW-C may be provided in response to a handover of the terminal device from 5GC to EPC. With the method of FIG. 26, it is possible to support the EPC and 5GC interworking and/or the ePDG and LTE interworking, without impacting the SBI interfaces in 5GC network.

Figure 27:
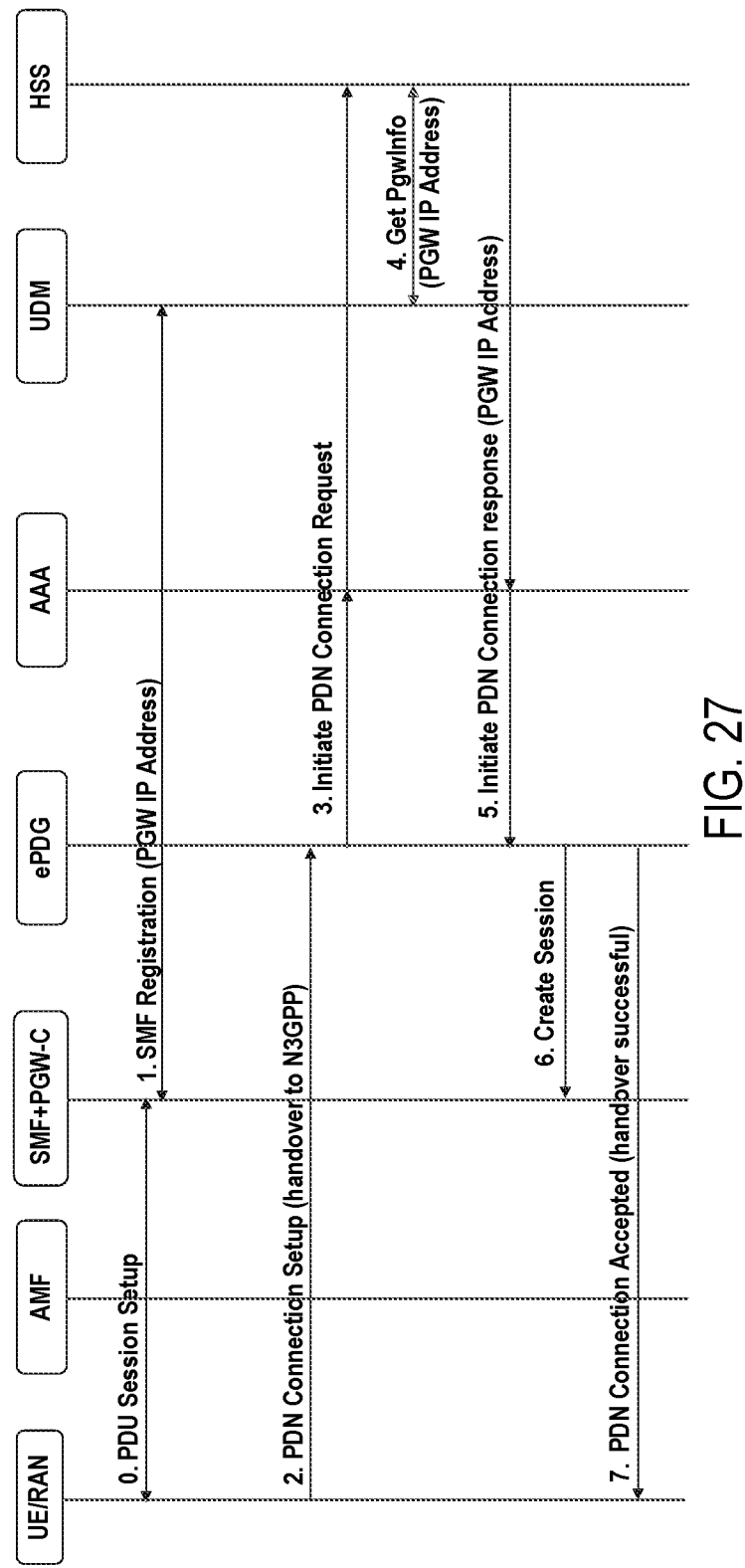
FIG. 27 is a flowchart illustrating an exemplary process according to an embodiment of the disclosure.

FIG. 27 is a flowchart illustrating an exemplary process according to an embodiment of the disclosure. This process relates to a 5GC to ePDG handover with the use of PGW IP Address. At step 0, a PDU Session is set up in 5GC between the UE and the SMF+PGW-C(simply referred to as the SMF below). At step 1, the SMF registers PGW FQDN and additionally PGW IP Address in UE Context in the SMF to the UDM. At step 2, the UE triggers Handover procedure to the ePDG in EPC. At step 3, the ePDG sends a request for initiating an existing PDN connection for access point name (APN) via S2b (supporting PGW IP Address only) to the authentication, authorization, and accounting (AAA) and the AAA contacts the HSS. At step 4, the HSS gets PgwInfo of the APN from the UDM using Nudm application programming interface (API), which includes the PGW IP Address. At step 5, the HSS returns it to the AAA then to the ePDG. At step 6, the ePDG uses the PGW IP Address to set up the PDN connection for the APN, taking over the PDU session established in 5GC. At step 7, the ePDG informs the UE that the PDU Session is resumed via the ePDG now. It can be seen that due to the new attribute of "PGW IP Address" being added by the SMF when registration in the UDM and the new attribute of "PGW IP address" being added in the interface between the HSS and the UDM, the 5GC to ePDG handover can be achieved in the case where the ePDG supports only PGW IP Address.

Figure 28:
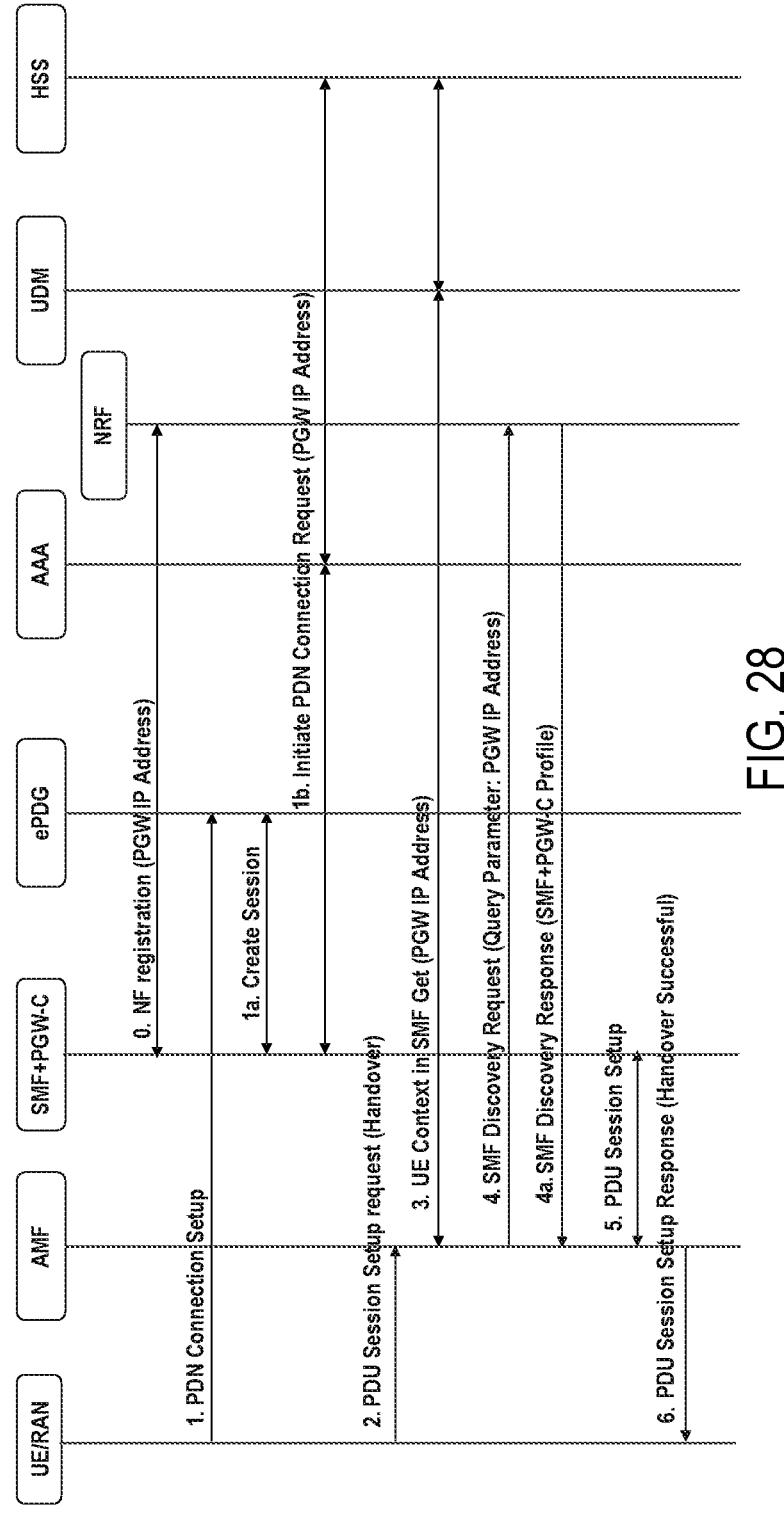
FIG. 28 is a flowchart illustrating an exemplary process according to an embodiment of the disclosure.

FIG. 28 is a flowchart illustrating an exemplary process according to an embodiment of the disclosure. This process relates to an ePDG to 5GC handover with the use of PGW IP Address. At step 0, the SMF+PGW-C registers PGW IP Address in its NF profile to the NRF. At steps 1, 1a and 1b, the UE sets up a PDN Connection via the ePDG at the SMF+PGW-C via S2b, and the AAA registers the PGW IP Address for the APN to the HSS. At step 2, the UE triggers Handover procedure to 5GC at the AMF. At step 3, the AMF requests UE Context in SMF from the UDM and the UDM gets the PgwInfo from the HSS (including the PGW IP Address). At steps 4 and 4a, the AMF queries the NRF for the target SMF+PGW-C using the PGW IP Address (registered by the SMF in the NRF at step 0), and gets the response to the query. At step 5, the AMF creates a PDU Session on the SMF+PGW-C with the data network name (DNN)/APN, taking over the PDN connection in ePDG. At step 6, the AMF informs the UE with successful handover to 5GC for the PDN connection. It can be seen that due to the new attribute of "PGW IP Address" being added by the SMF when registration in the NRF (so that the AMF can use the "PGW IP address" as query parameter to discover the SMF instance) and the new attribute of "PGW IP Address" being added in the interface between the HSS and the UDM, the ePDG to 5GC handover can be achieved in the case where only PGW IP address is available at EPC.

Based on the above description, one aspect of the disclosure provides a method implemented in a communication system including an SMF and a service provider. The method may comprise steps of the methods shown in FIGS. 7 and 8. Another aspect of the disclosure provides a method implemented in a communication system including an AMF and an NRF. The method may comprise steps of the methods shown in FIGS. 11 and 12. Yet another aspect of the disclosure provides a method implemented in a communication system including a service consumer and a service provider. The method may comprise steps of the methods shown in FIGS. 14 and 17. Yet another aspect of the disclosure provides a method implemented in a communication system including an HSS and a service consumer. The method may comprise steps of the method shown in FIG. 26. The method may further comprise, at the service consumer, obtaining the IP address of the PGW-C from the HSS.

Based on the above description, the following changes are proposed to be made to 3GPP TS 23.502 16.5.0, where the changes are highlighted with underlines. As described above, the IP address of the PGW-C mentioned in the above description and the claims is the PGW-C+SMF IP address mentioned below.

4.11.1 N26 based Interworking Procedures 4.11.1.1 General

. . .

During interworking from EPS to 5GS, as the PGW-C+SMF may have different IP addresses when being accessed over S5/S8 and N11/N16 respectively, the AMF shall discover the SMF instance by an NF/NF service discovery procedure using the FQDN or IP address for the S5/S8 interface received from the MME as a query parameter.

. . .

4.11.1.2.2.2 Preparation phase

. . .

FIG. 4.11.1.2.2.2-1: EPS to 5GS handover using N26 interface, preparation phase

. . .

3. Step 3 from clause 5.5.1.2.2 (S1-based handover, normal) in TS 23.401 [13] with the following modifications:

An additional optional parameter Return preferred. Return preferred is an optional indication provided by the MME to indicate a preferred return of the UE to the last used EPS PLMN at a later access change to an EPS shared network. Based on the Return Preferred indication, the initial AMF may store the last used EPS PLMN ID in the UE Context.

The initial AMF converts the received EPS MM Context into the 5GS MM Context. This includes converting the EPS security context into a mapped 5G security context as described in TS 33.501 [15]. The MME UE context includes IMSI, ME Identity, UE security context, UE Network Capability, and EPS Bearer context(s), and may also include LTE-M Indication. The MME EPS Bearer context(s) include for each EPS PDN connection the IP address and FQDN for the S5/S8 interface of the PGW-C+SMF and APN, and for each EPS bearer the IP address and CN Tunnel Info at the UPF+PGW-U for uplink traffic.

If the AMF received the LTE-M indication in the EPS MM Context, then it considers that the RAT Type is LTE-M.

The initial AMF queries the (PLMN level) NRF in serving PLMN by issuing the Nnrf_NFDiscovery_Request including the FQDN or IP address for the S5/S8 interface of the PGW-C+SMF, and the NRF provides the IP address or FQDN of the N11/N16 interface of the PGW-C+SMF.

If the initial AMF cannot retrieve the address of the corresponding SMF for a PDN connection, it will not move the PDN connection to 5GS.

. . .

4.11.1.3.3 EPS to 5GS Mobility Registration Procedure (Idle and Connected State) using N26 interface FIG. 4.11.1.3.3-1 describes the mobility registration procedure from EPS to 5GS when N26 is supported for idle and connected states.

. . .

5b. [Conditional] If step 5a is performed, step 5 from clause 5.3.3.1 (Tracking Area Update procedure with Serving GW change) in TS 23.401 [13] is performed with the modification captured in clause 4.11.1.5.3.

The AMF converts the received EPS MM Context into the 5GS MM Context. The received EPS UE context includes IMSI, ME Identity, UE EPS security context, UE Network Capability, and EPS Bearer context(s), and may also include LTE-M Indication. The MME EPS Bearer context includes for each EPS PDN connection the IP address and FQDN for the S5/S8 interface of the PGW-C+SMF and APN. If the SCEF connection is invoked, the MME EPS Bearer context includes the SCEF+NEF ID of the PDN connection, EBI, APN, User Identity. The AMF disregards any LTE-M Indication received in the EPS UE context, and instead takes into account the LTE M Indication received from NG-RAN, at step 1.

The AMF can determine the whether the UE is performing Inter-RAT mobility to or from NB-IoT based on the received "TAI of last TAU" in the EPC MM Context and the RAT Type used for the Registration Request.

If the Context Response includes the FQDN for the S5/S8 interface of the PGW-C+SMF, the AMF queries the NRF in serving PLMN by issuing the Nnrf_NFDiscovery_Request including the FQDN for the S5/S8 interface of the PGW-C+SMF, and the NRF provides the IP address or FQDN of the N11/N16 interface of the PGW-C+SMF. If the Context Response includes the FQDN for the S5/S8 interface of the PGW-C+SMF, the AMF queries the NRF using the IP address for the S5/S8 interface of the PGW-C+SMF.

If the Context Response includes an SCEF+NEF ID, the AMF performs the SMF selection.

The Context Response may include new information Return Preferred. Return Preferred is an indication by the MME of a preferred return of the UE to the last used EPS PLMN at a later access change to an EPS shared network. Based on the Return Preferred indication, the AMF may store the last used EPS PLMN ID in UE Context.

If the AMF cannot retrieve the address of the corresponding SMF for a PDN connection, it will not move the PDN connection to 5GS.

Step 6 is performed only if the AMF is different from the old AMF and the old AMF is in the same PLMN as the AMF 4.11.2 Interworking procedures without N26 interface 4.11.2.1 General Clause 4.11.2 defines the procedures to support interworking between 5GS and EPS without any N26 interface between AMF and MME.

During interworking from EPS to 5GS, as the PGW-C+SMF may have different IP addresses when being accessed over S5/S8 and N11/N16 respectively, the AMF shall discover the SMF instance by an NF/NF service discovery procedure using the FQDN or IP address for the S5/S8 interface received from the UDM as a query parameter.

. . .

4.11.2.2 5GS to EPS Mobility

. . .

0. UE is registered in 5GS and established PDU sessions. The FQDN or IP address for the S5/S8 interface of the PGW-C+SMF is also stored in the UDM by the PGW-C+SMF during PDU Session setup in addition to what is specified in clause 4.3.2.2.1 and clause 4.3.2.2.2.

NOTE 2: At 5GS to EPS mobility, the MME use the FQDN for the S5/S8 interface of the PGW-C+SMF to find the PGW-C+SMF, and when UE moves back from EPS to 5GS, the AMF uses FQDN or IP address for the S5/S8 interface of the PGW-C+SMF to find the PGW-C+SMF.

. . .

9. Step 11 as in clause 5.3.2.1 (E-UTRAN Initial Attach) in TS 23.401 [13], with the following modifications:

The subscription profile the MME receives from HSS+UDM includes per DNN/APN at most one PGW-C+SMF FQDN or IP address as described in in clause 5.17.2.1 in TS 23.501 [2].

. . .

4.11.2.3 EPS to 5GS Mobility

. . .

5. Step 14 as in clause 4.2.2.2.2 (General Registration), with the following modifications:

If the UE indicates that it is moving from EPC, and the Registration type is set to "initial registration" or "mobility registration update" in step 1, and AMF is configured to support 5GS-EPS interworking without N26 procedure, the AMF sends an Nudm_UECM_Registration Request message to the HSS+UDM indicating that registration of an MME at the HSS+UDM, if any, shall not be cancelled. The HSS+UDM does not send cancel location to the old MME.

NOTE 2: If the UE does not maintain registration in EPC, upon reachability time-out, the MME can implicitly detach the UE and release the possible remaining PDN connections in EPC.

The subscription profile the AMF receives from HSS+UDM includes the DNN/APN and PGW-C+SMF FQDN or IP address for S5/S8 interface for each PDN connection established in EPC. For emergency PDU Session, the AMF receives Emergency Information containing PGW-C+SMF FQDN from HSS+UDM.

. . .

9. UE requested PDU Session Establishment procedure as in clause 4.3.2.2.1.

If the UE had setup PDN Connections in EPC which it wants to transfer to 5GS and maintain the same IP address/prefix and the UE received "Interworking without N26" indicator in step 7, the UE performs the UE requested PDU Session Establishment Procedure as in clause 4.3.2.2 and sets the Request Type to "Existing PDU Session" or "Existing Emergency PDU Session" in step 1 of the procedure. The UE provides a DNN for non-emergency PDU Session, the PDU Session ID and S-NSSAI corresponding to the existing PDN connection it wants to transfer from EPS to 5GS. The S-NSSAI is set as described in TS 23.501 [2] clause 5.15.7.2.

If the Request Type indicates "Existing PDU Session", the AMF shall use PGW-C+SMF FQDN or IP address for S5/S8 interface from the HSS+UDM for the DNN.

If the Request Type indicates "Existing Emergency PDU Session", the AMF shall use the Emergency Information received from the HSS+UDM which contains PGW-C+SMF FQDN and IP address for S5/S8 interface for the emergency PDN connection established in EPS and the AMF shall use the S-NS-SAI locally configured in Emergency Configuration Data. UEs in single-registration mode performs this step for each PDN connection immediately after the step 8. UEs in dual-registration mode may perform this step any time after step 8. Also, UEs in dual-registration mode may perform this step only for a subset of PDU Sessions. The AMF determines the S5/S8 interface of the PGW-C+SMF for the PDU Session based on the DNN received from the UE and the PGW-C+SMF ID in the subscription profile received from the HSS+UDM in step 5 or when the HSS+UDM notifies the AMF for the new PGW-C+SMF ID in the updated subscription profile. The AMF queries the NRF in serving PLMN by issuing the Nnrf_NFDiscovery_Request including the FQDN or IP address for the S5/S8 interface of the PGW-C+SMF, and the NRF provides the IP address or FQDN of the N11/N16 interface of the PGW-C+SMF. The AMF invokes the Nsmf_PDUSession_CreateSMContext service with the SMF address provided by the NRF. The AMF includes the PDU Session ID to the request sent to the PGW-C+SMF.

. . .

4.11.2.4 Impacts to EPS Procedures
4.11.2.4.1 E-UTRAN Attach

. . .

Step 11:
The HSS+UDM selects one of the PGW-C+SMF FQDN or IP address for one APN based on operator's policy. The HSS+UDM sends selected PGW-C+SMF FQDN or IP address along with APN to the MME for the UE.

. . .

4.11.3 Handover procedures between EPS and 5GC-N3IWF
4.11.3.1 Handover from EPS to 5GC-N3IWF 2. The UE initiates a UE requested PDU Session Establishment with Existing PDU Session indication in 5GC via Untrusted non-3GPP Access via N3IWF per clause 4.12.5.

If the Request Type indicates "Existing PDU Session", the AMF shall use PGW-C+SMF FQDN or IP address for S5/S8 interface from the HSS+UDM for the DNN.

If the Request Type indicates "Existing Emergency PDU Session", the AMF shall use the Emergency Information received from the HSS+UDM which contains PGW-C+SMF FQDN or IP address for S5/S8 interface for the emergency PDN connection established in EPS and the AMF shall use the S-NS-SAI locally configured in Emergency Configuration Data.

The combined PGW+SMF/UPF initiates a PDN GW initiated bearer deactivation as described in TS 23.401 [13] clause 5.4.4.1 to release the EPC and E-UTRAN resources.

4.11.3.2 Handover from 5GC-N3IWF to EPS

. . .

0. Initial status: one or more PDU Sessions have been established in 5GC between the UE and the SMF/UPF via untrusted non-3GPP access and N3IWF. During PDU Session setup, and in addition to what is specified in clause 4.3.2.2.1 and clause 4.3.2.2.2, the AMF includes an indication that EPS interworking is supported to the PGW-C+SMF as specified in clause 4.11.5.3, and the PGW-C+SMF sends the FQDN or IP address related to the S5/S8 interface to the HSS+UDM which stores it as described in clause 4.11.5.

. . .

4.11.4.1 Handover from EPC/ePDG to 5GS

2. The UE initiates a UE requested PDU Session Establishment via 3GPP Access according to clause 4.3.2.2 and includes the "Existing PDU Session" indication or "Existing Emergency PDU Session" and the PDU Session ID.

For Request Type "Existing PDU Session", the UE provides a DNN, the PDU Session ID and S-NSSAI corresponding to the existing PDN connection it wants to transfer from EPC/ePDG to 5GS. The S-NSSAI and PLMN ID sent to the UE are set in the same way as for EPS to 5GS mobility as specified in clause 5.15.7.1 of TS 23.501 [2]. The AMF shall use PGW-C+SMF FQDN or IP address for the S2b interface it has received from the HSS+UDM.

If the Request Type indicates "Existing Emergency PDU Session", the AMF shall use the Emergency Information containing PGW-C+SMF FQDN or IP address for the S2b interface it has received from the HSS+UDM. The PGW-C+SMF FQDN or IP address was sent by PGW-C when the Emergency PDN connection was established in EPC via ePDG and the AMF shall use the S-NS-SAI locally configured in Emergency Configuration Data.

. . .

4.11.4.3.6 Use of N10 interface instead of S6b

. . .

The impacts to procedure in clause 4.11.4.1 (Handover from EPC/ePDG to 5GS) are as follows:

For step 0, the impacts to clause 7.2.4 of TS 23.402 [26] are captured above.

In step 2, if the Request Type indicates "Existing Emergency PDU Session", the AMF shall use the Emergency Information containing PGW-C+SMF FQDN or IP address for the S2b interface and the S NSSAI locally configured in Emergency Configuration Data.

In step 3, the impacts to clause 7.9.2 of TS 23.402 [26] are captured above. Nudm_UECM_Deregistration is not performed by PGW-C+SMF, as resources in the PGW-C+SMF are not released.

The impacts to procedures in clause 4.11.4.2 (Handover from 5GS to EPC/ePDG) are as follows:

For step 2, impacts to clause 8.6.2.1 (3GPP Access to Untrusted Non-3GPP IP Access Handover with GTP on S2b) of TS 23.402 [26] are captured above and Step 16c of FIG. 4.3.2.2.1-1 is not performed as PGW-C+SMF already registered in the HSS+UDM when the UE is in 5GS.

4.11.5.2 Registration procedure

. . .

Step 17: Additional trigger for step 17 Nsmf_PDUSession_UpdateSMContext are:

If status of interworking with EPS for a PDU session changes, e.g. due to change of 5GMM capability (e.g. "S1 mode supported"), the UE subscription data change (e.g. Core Network Type Restriction to EPC), the AMF invokes Nsmf_PDUSession_UpdateSMContext (EPS Interworking Indication with N26 or without N26) to SMF. The SMF determines whether the PDU session supports interworking with EPS need be changed. If it needs to be changed, the SMF invokes Nudm_UECM_Update service operation to add or remove the PGW-C FQDN and/or IP address for S5/S8 interface from the UE context in SMF data stored at the UDM.

. . .

4.11.5.3 UE Requested PDU Session Establishment procedure

. . .

Step 4: If the EPS Interworking indication received from AMF indicates that the UE supports EPS interworking and the SMF determines, based on the EPS interworking support indication from the AMF and additional UE subscription data (e.g. whether UP integrity protection of UP Security Enforcement Information is not set to required, EPS interworking is allowed for this DNN and S-NSSAI), that the PDU Session supports EPS interworking, the PGW-C+SMF FQDN or IP address or both for S5/S8 interface is included in the Nudm_UECM_Registration Request.

. . .

4.11.5.4 UE or Network Requested PDU Session Modification procedure

. . .

Step 3a: This step also applies to AMF initiated modification. For AMF initiated modification, the SMF may determines whether the PDU session supports EPS interworking need be changed. If it need be changed, the SMF invokes Nudm_UECM_Update service operation to add or remove the PGW-C FQDN and/or IP address for S5/S8 interface from the UE context in SMF data stored at the UDM,

. . .

5.2.3.2.1 Nudm_UECM_Registration service operation
Service operation name: Nudm_UECM_Registration

. . .

Inputs, Required: NF ID, SUPI, PEI, NF Type, Access Type (if NF Type is AMF, SMSF), RAT Type (if NF Type is AMF), PDU Session ID (if NF Type is SMF). If NF Type is SMF: DNN or Indication of Emergency Services, S-NSSAI, PGW-C+SMF FQDN or IP address for S5/S8 if the PDU Session supports EPS interworking, Serving PLMN ID. If NF type is AMF and Access Type is 3GPP access: Registration type. If NF type is SMSF: SMSF MAP address and/or Diameter address, Serving PLMN ID.

. . .

5.2.3.2.5 Nudm_UECM_Update service operation
Service operation name: Nudm_UECM_Update.
Description: Consumer updates some UE related information (e.g. UE capabilities, Intersystem continuity context, PGW-C+SMF FQDN or IP address for S5/S8 interface).
Inputs, Required: NF ID, SUPI, NF type, UE context information.
Inputs, Optional: "Homogeneous Support of IMS Voice over PS Sessions" indication (if NF Type is AMF), PGW-C+SMF FQDN or IP address for S5/S8 interface (if NF Type is SMF).
Outputs, Required: Result Indication.
Outputs, Optional: None.
5.2.3.3 Nudm_SubscriberDataManagement (SDM) Service
5.2.3.3.1 General
Subscription data types used in the Nudm_SubscriberData-Management Service are defined in Table 5.2.3.3.1-1 below.

| Subscription data type | Field | Description |
|---|---|---|
| . . . | . . . | . . . |
| UE context in SMF data | SUPI | Key. |
| | PDU Session Id(s) | List of PDU Session Id(s) for the UE. For emergency PDU Session Id: |
| | Emergency Information | The PGW-C+SMF FQDN for emergency session used for interworking with EPC. |

| Subscription data type | Field | Description |
|---|---|---|
| | | For each non-emergency PDU Session Id: |
| | DNN | DNN for the PDU Session. |
| | SMF | Allocated SMF for the PDU Session. Includes SMF IP Address and SMF NF Id. |
| | PGW-C+SMF FQDN | The S5/S8 PGW-C+SMF FQDN used for interworking with EPS (see NOTE 5). |
| | PGW-C+SMF IP address | The S5/S8 or S2b PGW-C+SMF IP address used for interworking with EPC. |
| . . . | . . . | . . . |

5.2.7.2.2 Nnrf_NFManagement_NFRegister service operation

Service Operation name: Nnrf_NFManagement_NFRegister.

Description: Registers the consumer NF in the NRF by providing the NF profile of the consumer NF to NRF, and NRF marks the consumer NF available.

Inputs, Required: NF type, NF instance ID, FODN or IP address of NF, Names of supported NF services (if applicable), and PLMN ID e.g. if NF needs to be discovered by other PLMNs.

> NOTE 1: for the UPF, the addressing information within the NF profile corresponds to the N4 interface.
> NOTE 2: For the purpose of the Nnrf_NFManagement service, the SCP is treated by the NRF in the same way as NFs. Specifically, the SCP is designated with a specific NF type and NF instance ID. However, the SCP does not support services.

Inputs, Optional:
> If the consumer NF stores Data Set(s) (e.g. UDR): Range(s) of SUPIs, range(s) of GPSIs, range(s) of external group identifiers, Data Set Identifier(s).
> If the consumer is BSF: Range(s) of (UE) IPv4 addresses or Range(s) of (UE) IPv6 prefixes, IP domain list as described in clause 6.1.6.2.21 of TS 29.510 [58].
> NOTE 3: Range of SUPI(s) is limited in this release to a SUPI type of IMSI as defined in TS 23.003 [33].
> If the consumer is UDM, UDR, PCF or AUSF, they can include UDM Group ID, UDR Group ID, PCF Group ID, AUSF Group ID respectively.
> For UDM and AUSF, Routing Indicator.
> If the consumer is AMF, it includes list of GUAMI(s). In addition, AMF may include list of GUAMI(s) for which it can serve as backup for failure/maintenance.
> If the consumer is CHF, it may include Range(s) of SUPIs, Range(s) of GPSIs, or Range(s) of PLMNs as defined in TS 32.290 [42].
> If the consumer is P-CSCF, the P-CSCF IP address(es) to be provided to the UE by SMF.

> If the consumer is HSS, IMPI range, IMPU range, HSS Group ID (as defined in TS 23.228 [55]) can be used as optional input parameters.
> For the UPF Management: UPF Provisioning Information as defined in clause 4.17.6.
> S-NSSAI(s) and the associated NSI ID(s) (if available).
> Information about the location of the NF consumer (operator specific information, e.g. geographical location, data center).
> TAI(s).
> NF Set ID.
> NF Service Set ID.
> If the consumer is SMF, it includes PGW FQDN or IP address for EPC interworking.

. . .

5.2.7.3.2 Nnrf_NFDiscovery_Request service operation
Service operation name: Nnrf_NFDiscovery_Request
Description: provides the IP address or FQDN of the expected NF instance(s) and, if present in NF profile, the Endpoint Address(es) of NF service instance(s) to the NF service consumer or SCP.

Inputs, Required: one or more target NF service Name(s), NF type of the target NF, NF type of the NF service consumer.

If the NF service consumer intends to discover an NF service producer providing all the standardized services, it provides a wildcard NF service name.

Inputs, Optional:
> S-NSSAI and the associated NSI ID (if available), DNN, target NF/NF service PLMN ID, NRF to be used to select NFs/services within HPLMN, Serving PLMN ID, the NF service consumer ID, preferred target NF location, TAI.
> NOTE 1: For network slicing the NF service consumer ID is a required input.
> FQDN or IP address for the S5/S8 or S2b interface of the PGW-C+SMF, to discover the N11/N16 interface of the PGW-C+SMF in the case of EPC to 5GC mobility.

Based on the above description, the following changes are proposed to be made to 3GPP TS 29.503 17.3.0, where the changes are highlighted with underlines.

6.1.6.2.28 Type: PgwInfo

TABLE 6.1.6.2.28-1

| | | | | Definition of type PgwInfo |
|---|---|---|---|---|
| Attribute name | Data type | P | Cardinality | Description |
| dnn | Dnn | M | 1 | DNN/APN with Network Identifier only. |
| pgwFqdn | string | M | 1 | FQDN of the PGW in the "PGW-C+SMF" (NOTE) |
| pgwIpAddr | IpAddress | O | 0 . . . 1 | IP Address of the PGW in the "PGW-C+SMF" |

TABLE 6.1.6.2.28-1-continued

| Attribute name | Data type | P | Cardinality | Description |
|---|---|---|---|---|
| | | | | Definition of type PgwInfo |
| plmnId | PlmnId | O | 0 . . . 1 | PLMN where the PGW-C+SMF is located |
| epdgInd | boolean | O | 0 . . . 1 | If present, it indicates whether access is from ePDG or not. true: access is from ePDG. false or absent: access is not from ePDG |
| pcfId | NfInstanceId | C | 0 . . . 1 | This IE shall be present if the PCF Selection Assistance Info is received from the UDM. When present, it indicates the PCF identifier serving the PDU Session/PDN Connection that should be selected by the AMF. |

(NOTE):
This IE may contain an empty string when the PGW Informa-
tion is mapped from HSS and PGW FQDN is not registered in HSS.

6.2.6.2.4 Type: SmfRegistration

TABLE 6.2.6.2.4-1

| Attribute name | Data type | P | Cardinality | Description |
|---|---|---|---|---|
| | | | | Definition of type SmfRegistration |
| smfInstanceId | NfInstanceId | M | 1 | NF Instance Id of the SMF |
| smfSetId | NfSetId | C | 0 . . . 1 | This IE shall be present if the SMF belongs to a SMF SET. If present, it indicates the NF Set ID of SMF Set. |
| supportedFeatures | SupportedFeatures | O | 0 . . . 1 | See clause 6.2.8 These are the features supported by the SMF. |
| pduSessionId | PduSessionId | M | 1 | PDU Session ID |
| singleNssai | Snssai | M | 1 | A single Network Slice Selection Assistance Information |
| dnn | Dnn | C | 0 . . . 1 | Data Network Name; shall be present if emergencyServices is false or absent. When present, this IE shall contain the Network Identifier only. |
| emergencyServices | boolean | C | 0 . . . 1 | Indication of Emergency Services; absence indicates false. |
| pcscfRestorationCallbackUri | Uri | O | 0 . . . 1 | a URI provided by the SMF to receive (implicitly subscribed) notifications on the need for P-CSCF Restoration |
| plmnId | PlmnId | M | 1 | Serving node PLMN identity. |
| pgwFqdn | string | C | 0 . . . 1 | FQDN of the PGW in the "PGW-C+SMF", to be included for interworking with EPS. |
| pgwIpAddr | IpAddress | O | 0 . . . 1 | IP Address of the PGW in the "PGW-C+SMF", to be included for interworking with EPS. |
| epdgInd | boolean | O | 0 . . . 1 | Indicate whether access is from ePDG. true: access from ePDG. false or absent: not access from ePDG |
| deregCallbackUri | Uri | O | 0 . . . 1 | A URI provided by the SMF to receive (implicitly subscribed) notifications on deregistration. The deregistration callback URI shall have unique information within SMF set to identify the UE to be deregistered. |
| registrationReason | RegistrationReason | O | 0 . . . 1 | Indicates registration reason. |
| registrationTime | Date Time | C | 0 . . . 1 | Time of SmfRegistration. Shall be present when used on Nudr. |
| contextInfo | ContextInfo | C | 0 . . . 1 | This IE if present may contain e.g. the headers received by the UDM along with the SmfRegistration. Shall be absent on Nudm and may be present on Nudr. |

TABLE 6.2.6.2.4-1-continued

| Attribute name | Data type | P | Cardinality | Description |
|---|---|---|---|---|
| | Definition of type SmfRegistration | | | |
| pcfId | NfInstanceId | C | 0 . . . 1 | This IE shall be present if the SMF is indicated to select the same PCF instance for SM Policy Control. When present, it indicates the PCF Identifier that serving the PDU Session/PDN Connection. |

Based on the above description, the following changes are proposed to be made to 3GPP TS 29.510 17.2.0, where the changes are highlighted with underlines.

6.1.6.1 General

TABLE 6.1.6.1-2

| Data type | Reference | Comments |
|---|---|---|
| | Nnrf_NFManagement re-used Data Types | |
| . . . | . . . | . . . |
| SupportedGADShapes | 3GPP TS 29.572 [33] | Supported GAD Shapes |
| IpAddr | 3GPP TS 29.571 [7] | IP Address |

6.1.6.2.12 Type: SmfInfo

TABLE 6.1.6.2.12-1

| Attribute name | Data type | P | Cardinality | Description |
|---|---|---|---|---|
| | Definition of type SmfInfo | | | |
| sNssaiSmfInfoList | array(SnssaiSmfInfoItem) | M | 1 . . . N | List of parameters supported by the SMF per S-NSSAI (NOTE 1). |
| taiList | array(Tai) | O | 1 . . . N | The list of TAIs the SMF can serve. It may contain one or more non-3GPP access TAIs. The absence of this attribute and the taiRangeList attribute indicate that the SMF can be selected for any TAI in the serving network. |
| taiRangeList | array(TaiRange) | O | 1 . . . N | The range of TAIs the SMF can serve. It may contain non-3GPP access TAIs. The absence of this attribute and the taiList attribute indicate that the SMF can be selected for any TAI in the serving network. |
| pgwFqdn | Fqdn | O | 0 . . . 1 | The FQDN of the PGW if the SMF is a combined SMF/PGW-C. |
| pgwIpAddr | IpAddr | O | 0 . . . 1 | The PGW IP address if the SMF is a combined SMF/PGW-C |
| accessType | array(AccessType) | C | 1 . . . 2 | If included, this IE shall contain the access type (3GPP_ACCESS and/or NON_3GPP_ACCESS) supported by the SMF. If not included, it shall be assumed the both access types are supported. |
| priority | integer | O | 0 . . . 1 | Priority (relative to other NFs of the same type) in the range of 0-65535, to be used for NF selection for a service request matching the attributes of the SmfInfo; lower values indicate a higher priority. The NRF may overwrite the received priority value when exposing an NFProfile with the Nnrf_NFDiscovery service. Absence of this attribute equals to having the same smfInfo priority as the priority defined at NFProfile/NFService level. (NOTE 2) |

TABLE 6.1.6.2.12-1-continued

| Definition of type SmfInfo | | | | |
|---|---|---|---|---|
| Attribute name | Data type | P | Cardinality | Description |
| vsmfSupportInd | boolean | O | 0 . . . 1 | This IE may be used by an SMF to explicitly indicate the support of V-SMF capability and its preference to be selected as V-SMF. When present, this IE shall indicate whether the V-SMF capability are supported by the SMF: true: V-SMF capability supported by the SMF false: V-SMF capability not supported by the SMF. Absence of this IE indicates the V-SMF capability support of the SMF is not specified. |

(NOTE 1):
If this S-NSSAIs is present in the SmfInfo and in the NFprofile, the S-NSSAIs from the SmfInfo shall prevail.
(NOTE 2):
An SMF profile may e.g. contain multiple SmfInfo entries, with each entry containing a different list of TAIs and a different priority, to differentiate the priority to select the SMF based on the user location. The priority in SmfInfo applies between SMFs or SMF Services with the same priority.

6.2.6.1 General

TABLE 6.2.6.1-2

| Nnrf_NFDiscovery re-used Data Types | | |
|---|---|---|
| Data type | Reference | Comments |
| . . . | . . . | . . . |
| SeppInfo | 3GPP TS 29.510 | See clause 6.1.6.2.72 |
| IpAddr | 3GPP TS 29.571 [7] | IP Address |

6.2.3.2.3.1 GET

TABLE 6.2.3.2.3.1-1

| URI query parameters supported by the GET method on this resource | | | | | |
|---|---|---|---|---|---|
| Name | Data type | P | Cardinality | Description | Applicability |
| . . . | . . . | . . . | . . . | . . . | . . . |
| pgw | Fqdn | O | 0 . . . 1 | If included, this IE shall contain the PGW FQDN which is received by the AMF from the MME to find the combined SMF/PGW-C. | |
| pgw-ip | IpAddr | O | 0 . . . 1 | If included, this IE shall contain the PGW IP Address used by the AMF to find the combined SMF/PGW-C. | |
| gpsi | Gpsi | C | 0 . . . 1 | If included, this IE shall contain the GPSI of the requester UE to search for an appropriate NF. GPSI may be included if the target NF type is "CHF" "PCF", "UDM" or "UDR". | |
| . . . | . . . | . . . | . . . | . . . | . . . |
| | | | | . . . | |

Figure 29:
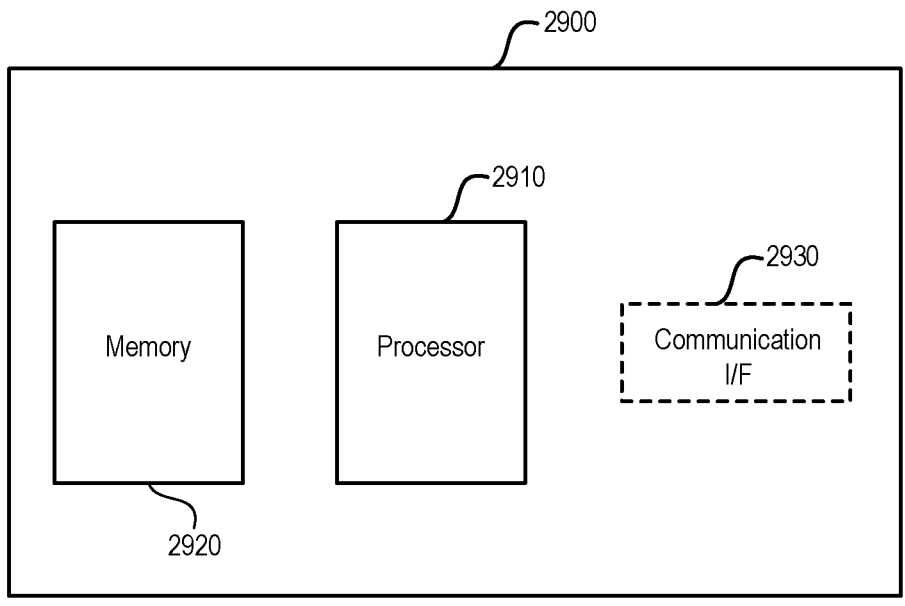
FIG. 29 is a block diagram showing an apparatus suitable for use in practicing some embodiments of the disclosure.

FIG. 29 is a block diagram showing an apparatus suitable for use in practicing some embodiments of the disclosure. For example, any one of the SMF, the service provider, the AMF, the NRF, the service consumer and the HSS described above may be implemented through the apparatus 2900. As shown, the apparatus 2900 may include a processor 2910, a memory 2920 that stores a program, and optionally a communication interface 2930 for communicating data with other external devices through wired and/or wireless communication.

The program includes program instructions that, when executed by the processor 2910, enable the apparatus 2900 to operate in accordance with the embodiments of the present disclosure, as discussed above. That is, the embodiments of the present disclosure may be implemented at least in part by computer software executable by the processor 2910, or by hardware, or by a combination of software and hardware.

The memory 2920 may be of any type suitable to the local technical environment and may be implemented using any suitable data storage technology, such as semiconductor based memory devices, flash memories, magnetic memory devices and systems, optical memory devices and systems, fixed memories and removable memories. The processor 2910 may be of any type suitable to the local technical environment, and may include one or more of general purpose computers, special purpose computers, microprocessors, digital signal processors (DSPs) and processors based on multi-core processor architectures, as non-limiting examples.

Figure 30:
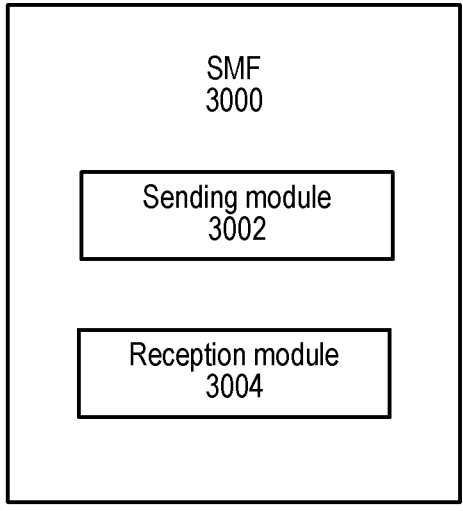
FIG. 30 is a block diagram showing an apparatus implementing an SMF according to an embodiment of the disclosure.

FIG. 30 is a block diagram showing an apparatus implementing an SMF according to an embodiment of the disclosure. As shown, the apparatus 3000 comprises a sending module 3002 and a reception module 3004. The sending module 3002 may be configured to send, to a service provider, a request for registering information related to the SMF to the service provider, as described above with respect to block 702. The information related to the SMF may comprise information indicating or derived from an IP address of a PGW-C that is combined together with the SMF. The reception module 3004 may be configured to receive, from the service provider, a response to the request, as described above with respect to block 704.

Figure 31:
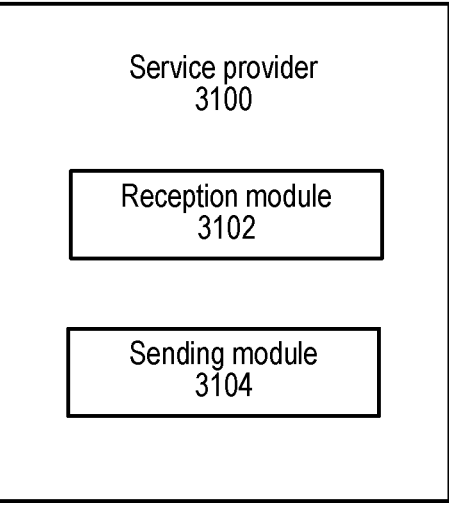
FIG. 31 is a block diagram showing a service provider according to an embodiment of the disclosure.

FIG. 31 is a block diagram showing a service provider according to an embodiment of the disclosure. As shown, the service provider 3100 comprises a reception module 3102 and a sending module 3104. The reception module 3102 may be configured to receive, from an SMF, a request for registering information related to the SMF to the service provider, as described above with respect to block 802. The information related to the SMF may comprise information indicating or derived from an IP address of a PGW-C that is combined together with the SMF. The sending module 3104 may be configured to send, to the SMF, a response to the request, as described above with respect to block 804.

Figures 32, 33:
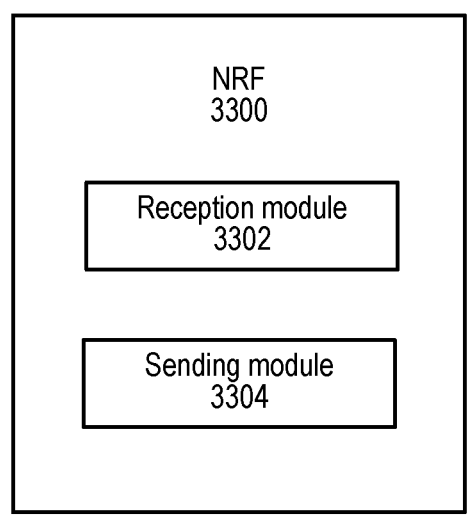
FIG. 32 is a block diagram showing an apparatus implementing an AMF according to an embodiment of the disclosure.
FIG. 33 is a block diagram showing an apparatus implementing an NRF according to an embodiment of the disclosure.

FIG. 32 is a block diagram showing an apparatus implementing an AMF according to an embodiment of the disclosure. As shown, the apparatus 3200 comprises a sending module 3202 and a reception module 3204. The sending module 3202 may be configured to send, to an NRF, a request for discovering an SMF instance satisfying one or more query parameters, as described above with respect to block 1102. The one or more query parameters may comprise an IP address of a PGW-C that is combined together with the SMF instance. The reception module 3204 may be configured to receive, from the NRF, a response to the request, as described above with respect to block 1104.

FIG. 33 is a block diagram showing an apparatus implementing an NRF according to an embodiment of the disclosure. As shown, the apparatus 3300 comprises a reception module 3302 and a sending module 3304. The reception module 3302 may be configured to receive, from an AMF, a request for discovering an SMF instance satisfying one or more query parameters, as described above with respect to block 1202. The one or more query parameters may comprise an IP address of a PGW-C that is combined together with the SMF instance. The sending module 3304 may be configured to send, to the AMF, a response to the request, as described above with respect to block 1204.

FIG. 34 is a block diagram showing a service consumer according to an embodiment of the disclosure. As shown, the service consumer 3400 comprises an obtaining module 3402 configured to obtain, from a service provider, current or updated subscription information of a terminal device, as described above with respect to block 1402. The current or updated subscription information of the terminal device may comprise information indicating or derived from an IP address of a PGW-C that is combined together with an SMF.

FIG. 35 is a block diagram showing a service provider according to an embodiment of the disclosure. As shown, the service provider 3500 comprises a provision module 3502 configured to provide, to a service consumer, current or updated subscription information of a terminal device, as described above with respect to block 1702. The current or updated subscription information of the terminal device may comprise information indicating or derived from an IP address of a PGW-C that is combined together with an SMF.

FIG. 36 is a block diagram showing an HSS according to an embodiment of the disclosure. As shown, the HSS 3600 comprises an obtaining module 3602, a conversion module 3604 and a provision module 3606. The obtaining module 3602 may be configured to obtain, from a UDM, current or updated subscription information of a terminal device, as described above with respect to block 2602. The current or updated subscription information of the terminal device may comprise information derived from an IP address of a PGW-C that is combined together with an SMF. The conversion module 3604 may be configured to convert the derived information back to the IP address of the PGW-C, as described above with respect to block 2604. The provision module 3606 may be configured to provide the IP address of the PGW-C to a service consumer, as described above with respect to block 2606. The modules described above may be implemented by hardware, or software, or a combination of both.

Based on the above description, one aspect of the disclosure provides a communication system including the SMF of FIG. 30 and the service provider of FIG. 31. Another aspect of the disclosure provides a communication system including the AMF of FIG. 32 and the NRF of FIG. 33. Yet another aspect of the disclosure provides a communication system including the service consumer of FIG. 34 and the service provider of FIG. 35. Yet another aspect of the disclosure provides a communication system including the HSS of FIG. 36 and a service consumer. The service consumer may be configured to obtain the IP address of the PGW-C from the HSS.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one skilled in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements. It should be noted that two blocks shown in succession in the above figures may, in fact, be executed substantially concurrently, or the blocks may sometimes be executed in the reverse order, depending upon the functionality involved.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method performed by a service provider, the method comprising:
   receiving, from a session management function (SMF), a request for registering information related to the SMF to the service provider, wherein the information related to the SMF comprises information indicating or derived from an Internet protocol (IP) address of a packet data network (PDN) gateway (PGW) control plane (PGW-C) that is combined together with the SMF, wherein the information indicating or derived from the IP address of the PGW-C is the IP address as an octet string filled in an information element called "PGW fully qualified domain name, FQDN"; and
   sending, to the SMF, a response to the request.

2. The method according to claim 1, wherein the service provider implements a network function (NF) repository function (NRF) and/or a unified data management (UDM).

3. The method according to claim 2, wherein:
   the information related to the SMF is a profile of the SMF; and/or
   the request is an Nnrf_NFManagement_NFRegister_request.

4. The method according to claim 2, wherein the SMF is registered as a NF serving a protocol data unit (PDU) session for a terminal device and/or wherein the request is an Nudm_UECM_Registration request.

5. The method according to claim 1, wherein the SMF is registered as a NF serving a protocol data unit (PDU) session for a terminal device, wherein the request is received in response to the PDU session being established for the terminal device.

6. The method according to claim 1, wherein the request is a first request, wherein the response is a first response, wherein the service provider implements a network function (NF) repository function (NRF), and wherein the method further comprises:
   receiving, from an access and mobility management function (AMF), a second request for discovering a session management function (SMF) instance satisfying one or more query parameters, wherein the one or more query parameters comprise an Internet protocol (IP) address of a packet data network (PDN) gateway (PGW) control plane (PGW-C) that is combined together with the SMF instance; and sending, to the AMF, a second response to the second request.

7. The method according to claim 6, wherein:

the second response comprises information related to the SMF instance; and/or the second request is an Nnrf_NFDiscovery_Request; and/or the second request is received in response to a handover of a terminal device from evolved packet core (EPC) to 5th generation core (5GC).

8. The method according to claim 1, wherein the request includes the information element called "PGW fully qualified domain name, FQDN", wherein a data body of the information element is filled with the IP address of the PGW-C as the octet string.

9. A method performed by a service provider, the method comprising:

providing, to a service consumer, current or updated subscription information of a terminal device;

wherein the current or updated subscription information of the terminal device comprises information indicating or derived from an Internet protocol (IP) address of a packet data network (PDN) gateway (PGW) control plane (PGW-C) that is combined together with a session management function (SMF), wherein the information indicating or derived from the IP address of the PGW-C is the IP address as an octet string filled in an information element called "PGW fully qualified domain name, FQDN".

10. The method according to claim 9, wherein providing the current subscription information of the terminal device comprises:

receiving, from the service consumer, a first request for obtaining the current subscription information of the terminal device; and sending, to the service consumer, a first response to the first request, wherein the first response comprises the information indicating or derived from the IP address of the PGW-C.

11. The method according to claim 9, wherein providing the updated subscription information of the terminal device comprises:

sending, to the service consumer, a second request for notifying the updated subscription information of the terminal device, wherein the updated subscription information of the terminal device comprises the information indicating or derived from the IP address of the PGW-C; and receiving, from the service consumer, a second response to the second request.

12. The method according to claim 9, wherein:

the service provider is a unified data management (UDM); and/or the first request is an Nudm_SDM_Get request indicating a subscription data type as "UE context in SMF data" and the first response is an Nudm_SDM_Get response.

13. The method according to claim 12, wherein:

the second request is an Nudm_SDM_Notification request and the second response is an Nudm_SDM_Notification response; and/or the service consumer is an access and mobility management function (AMF); and/or the current or updated subscription information of the terminal device is provided in response to a handover of the terminal device from evolved packet core (EPC) to 5th generation core (5GC).

14. The method according to claim 12, wherein the service consumer is a home subscriber server (HSS) and/or wherein the current or updated subscription information of the terminal device is provided in response to a handover of the terminal device from 5GC to EPC.

15. The method according to claim 9, wherein:

the service provider is an HSS and the service consumer is a UDM; and/or the first request is an Nhss_SDM_Get request and the first response is an Nhss_SDM_Get response; and/or the second request is an Nhss_SDM_Notification request and the second response is an Nhss_SDM_Notification response.

16. The method according to claim 15, wherein the current or updated subscription information of the terminal device is provided in response to a handover of the terminal device from EPC to 5GC.

17. A service provider comprising:

at least one processor; and at least one memory, the at least one memory containing instructions executable by the at least one processor, whereby the service provider is operative to:

receive, from a session management function (SMF), a request for registering information related to the SMF to the service provider, wherein the information related to the SMF comprises information indicating or derived from an Internet protocol (IP) address of a packet data network (PDN) gateway (PGW) control plane (PGW-C) that is combined together with the SMF, wherein the information indicating or derived from the IP address of the PGW-C is the IP address as an octet string filled in an information element called "PGW fully qualified domain name, FQDN" and send, to the SMF, a response to the request.

18. The service provider according to claim 17, wherein the request includes the information element called "PGW fully qualified domain name, FQDN", wherein a data body of the information element is filled with the IP address of the PGW-C as the octet string.

19. The service provider according to claim 17, wherein the request is a first request, wherein the response is a second response, wherein the service provider is configured to implement a network function (NF) repository function (NRF), the at least one memory containing instructions executable by the at least one processor, whereby the service provider is further operative to:

receive, from an access and mobility management function (AMF), a second request for discovering a session management function (SMF) instance satisfying one or more query parameters, wherein the one or more query parameters comprise an Internet protocol (IP) address of a packet data network (PDN) gateway (PGW) control plane (PGW-C) that is combined together with the SMF instance; and send, to the AMF, a second response to the second request.

20. A service provider comprising:

at least one processor; and at least one memory, the at least one memory containing instructions executable by the at least one processor, whereby the service provider is operative to:

provide, to a service consumer, current or updated subscription information of a terminal device;

wherein the current or updated subscription information of the terminal device comprises information indicating or derived from an Internet protocol (IP) address of a packet data network (PDN) gateway (PGW) control plane (PGW-C) that is combined together with a session management function (SMF), wherein the information indicating or derived from the IP address of the PGW-C is the IP address as an octet string filled in an information element called "PGW fully qualified domain name, FQDN".

\* \* \* \* \*